United States Patent [19]
Ueda et al.

[11] Patent Number: 5,963,755
[45] Date of Patent: Oct. 5, 1999

[54] PRINTING APPARATUS AND CONTROL DEVICE FOR OPTION EQUIPMENT CONNECTED THERETO

[75] Inventors: Shigeru Ueda, Wako; Junichi Kimizuka, Yokohama; Satoshi Nagata, Tama; Akihiro Nakamura, Kawasaki; Yuichi Higuchi, Funabashi; Satoshi Egawa, Kawasaki; Yoichi Toyokura, Yokohama; Shinichiro Maekawa, Kawasaki; Yutaka Tokura, Machida, all of Japan

[73] Assignee: Canon Kabushiki Kaisha, Tokyo, Japan

[21] Appl. No.: 08/632,534

[22] Filed: Apr. 15, 1996

[30]    Foreign Application Priority Data

Apr. 17, 1995  [JP]  Japan .................................... 7-115102
May 16, 1995  [JP]  Japan .................................... 7-141091

[51] Int. Cl.⁶ .................................................. G03G 15/00
[52] U.S. Cl. .......................... 399/23; 271/9.02; 271/9.03; 271/288; 399/19; 399/21; 399/391
[58] Field of Search ................................ 399/19, 21, 23, 399/76, 77, 388, 391, 393, 394, 405, 38; 271/288, 298, 9.02, 9.03, 9.04, 9.11

[56]              References Cited

U.S. PATENT DOCUMENTS

| 4,579,446 | 4/1986 | Fujino et al. . |
| 4,734,747 | 3/1988 | Okuda et al. ............................... 399/23 |
| 4,918,489 | 4/1990 | Inage et al. ............................... 399/391 |
| 4,985,736 | 1/1991 | Kawano et al. .......................... 399/391 |
| 5,083,142 | 1/1992 | Kotabe ..................................... 346/134 |
| 5,168,316 | 12/1992 | Hino et al. ................................ 399/23 |
| 5,247,337 | 9/1993 | Malachowski ............................. 399/76 |
| 5,323,220 | 6/1994 | Yasuda ..................................... 399/391 |
| 5,359,400 | 10/1994 | Itoh et al. . |
| 5,374,045 | 12/1994 | Milillo ................................... 271/9.06 |
| 5,393,043 | 2/1995 | Nitta ..................................... 271/9.06 |
| 5,418,904 | 5/1995 | Tomiyasu et al. ....................... 395/114 |
| 5,666,595 | 9/1997 | Sameshima et al. ............... 399/393 X |
| 5,758,249 | 5/1998 | Dutton et al. ........................... 399/391 |

*Primary Examiner*—Matthew S. Smith
*Attorney, Agent, or Firm*—Fitzpatrick, Cella, Harper & Scinto

[57]                ABSTRACT

A printing apparatus is provided with a main body including a video controller, having video signal generation device for generating a video signal from image information based on a recording command from an external apparatus and control device, and with a supervisory controller including optional unit control device for controlling at least an optional unit connectable to the main body. The video controller includes a process time informing device for informing the supervisory controller of an image development process time, and the supervisory controller includes a paper transport time memory for storing the paper transport time from the optional paper feed source to the entrance of the printing apparatus, a comparator for comparing the process time informed by the process time informing device with the paper transport time stored in the paper transport time memory, and a paper feed source changing device for changing the paper feed source in case the comparator identifies that the process time is shorter. The supervisory controller effects change of the order of process, determination of the paper feed unit, continuation of the printing process in case of paper jamming. There is provided a printing apparatus for printing text data received from an external apparatus, including paper feed units and paper ejecting units provided as standard components and paper feed units and paper ejecting units connectable as optional units, wherein an optimum combination is selected among the usable ones among the above-mentioned paper feed and ejecting units.

36 Claims, 26 Drawing Sheets

FIG. 19

| 901 | 902 | 903 | 904 |
|---|---|---|---|
| STANDARD UPPER STAGE PAPER FEED UNIT | A4 | PRESENT | READY |
| STANDARD LOWER STAGE PAPER FEED UNIT | A3 | PRESENT | READY |
| OPTION 500×3 PAPER FEED UNIT A | A4 | PRESENT | READY |
| OPTION 500×3 PAPER FEED UNIT B | B4 | PRESENT | READY |
| OPTION 500×3 PAPER FEED UNIT C | A3 | PRESENT | READY |
| OPTION 500×3 PAPER FEED UNIT A | A4 | PRESENT | READY |
| OPTION 500×3 PAPER FEED UNIT B | A4 | PRESENT | READY |
| OPTION 500×3 PAPER FEED UNIT C | A3 | PRESENT | READY |
| NOTHING | — | — | — |

Rows 3–5: 134
Rows 6–8: 135

FIG. 20

| 1001 | 1002 | 1005 | 1004 |
|---|---|---|---|
| STANDARD FACE-DOWN PAPER EJECT UNIT | 250 | EMPTY | READY |
| OPTION 100×8 SORTER A | 100 | EMPTY | READY |
| OPTION 100×8 SORTER B | 100 | EMPTY | READY |
| OPTION 100×8 SORTER C | 100 | EMPTY | READY |
| OPTION 100×8 SORTER D | 100 | EMPTY | READY |
| OPTION 100×8 SORTER E | 100 | EMPTY | READY |
| OPTION 100×8 SORTER F | 100 | EMPTY | READY |
| OPTION 100×8 SORTER G | 100 | EMPTY | READY |
| OPTION 100×8 SORTER H | 100 | EMPTY | READY |
| NOTHING | — | — | — |

Rows 2–9: 133

FIG. 21A

| | 901 | 902 | 903 | 904 |
|---|---|---|---|---|
| STANDARD UPPER STAGE PAPER FEED UNIT | A4 | PRESENT | NOT READY | |
| STANDARD LOWER STAGE PAPER FEED UNIT | A3 | PRESENT | NOT READY | |
| OPTION 500×3 PAPER FEED UNIT A | A4 | PRESENT | READY | |
| OPTION 500×3 PAPER FEED UNIT B | B4 | PRESENT | READY | } 134 |
| OPTION 500×3 PAPER FEED UNIT C | A3 | PRESENT | READY | |
| OPTION 500×3 PAPER FEED UNIT A | A4 | PRESENT | READY | |
| OPTION 500×3 PAPER FEED UNIT B | A4 | PRESENT | READY | } 135 |
| OPTION 500×3 PAPER FEED UNIT C | A3 | PRESENT | READY | |
| NOTHING | — | — | — | |

FIG. 21B

| | 901 | 902 | 903 | 904 |
|---|---|---|---|---|
| STANDARD UPPER STAGE PAPER FEED UNIT | A4 | PRESENT | READY | |
| STANDARD LOWER STAGE PAPER FEED UNIT | A3 | PRESENT | READY | |
| OPTION 500×3 PAPER FEED UNIT A | A4 | PRESENT | READY | |
| OPTION 500×3 PAPER FEED UNIT B | B4 | PRESENT | READY | } 134 |
| OPTION 500×3 PAPER FEED UNIT C | A3 | PRESENT | READY | |
| OPTION 500×3 PAPER FEED UNIT A | A4 | PRESENT | READY | |
| OPTION 500×3 PAPER FEED UNIT B | A4 | PRESENT | READY | } 135 |
| OPTION 500×3 PAPER FEED UNIT C | A3 | PRESENT | READY | |
| NOTHING | — | — | — | |

FIG. 22A

| | 1001 | 1002 | 1003 | 1004 |
|---|---|---|---|---|
| STANDARD FACE-DOWN PAPER EJECT UNIT | 250 | EMPTY | NOT READY |
| OPTION 100×8 SORTER A | 100 | EMPTY | READY |
| OPTION 100×8 SORTER B | 100 | EMPTY | READY |
| OPTION 100×8 SORTER C | 100 | EMPTY | READY |
| OPTION 100×8 SORTER D | 100 | EMPTY | READY |
| OPTION 100×8 SORTER E | 100 | EMPTY | READY |
| OPTION 100×8 SORTER F | 100 | EMPTY | READY |
| OPTION 100×8 SORTER G | 100 | EMPTY | READY |
| OPTION 100×8 SORTER H | 100 | EMPTY | READY |
| NOTHING | — | — | — |

FIG. 22B

| | 1001 | 1002 | 1003 | 1004 |
|---|---|---|---|---|
| STANDARD FACE-DOWN PAPER EJECT UNIT | 250 | EMPTY | READY |
| OPTION 100×8 SORTER A | 100 | EMPTY | NOT READY |
| OPTION 100×8 SORTER B | 100 | EMPTY | NOT READY |
| OPTION 100×8 SORTER C | 100 | EMPTY | NOT READY |
| OPTION 100×8 SORTER D | 100 | EMPTY | NOT READY |
| OPTION 100×8 SORTER E | 100 | EMPTY | NOT READY |
| OPTION 100×8 SORTER F | 100 | EMPTY | NOT READY |
| OPTION 100×8 SORTER G | 100 | EMPTY | NOT READY |
| OPTION 100×8 SORTER H | 100 | EMPTY | NOT READY |
| NOTHING | — | — | — |

FIG. 22C

| | 1001 | 1002 | 1003 | 1004 |
|---|---|---|---|---|
| STANDARD FACE-DOWN PAPER EJECT UNIT | 250 | EMPTY | READY |
| OPTION 100×8 SORTER A | 100 | PRESENT | READY |
| OPTION 100×8 SORTER B | 100 | EMPTY | READY |
| OPTION 100×8 SORTER C | 100 | EMPTY | READY |
| OPTION 100×8 SORTER D | 100 | EMPTY | READY |
| OPTION 100×8 SORTER E | 100 | EMPTY | READY |
| OPTION 100×8 SORTER F | 100 | EMPTY | READY |
| OPTION 100×8 SORTER G | 100 | EMPTY | READY |
| OPTION 100×8 SORTER H | 100 | EMPTY | READY |
| NOTHING | — | — | — |

FIG. 23A

| 901 | 902 | 903 | 904 |
|---|---|---|---|
| STANDARD UPPER STAGE PAPER FEED UNIT | A4 | PRESENT | NOT READY |
| STANDARD LOWER STAGE PAPER FEED UNIT | A3 | PRESENT | NOT READY |
| OPTION 500×3 PAPER FEED UNIT A | A4 | PRESENT | NOT READY |
| OPTION 500×3 PAPER FEED UNIT B | B4 | PRESENT | NOT READY |
| OPTION 500×3 PAPER FEED UNIT C | A3 | PRESENT | NOT READY |
| OPTION 500×3 PAPER FEED UNIT A | A4 | PRESENT | NOT READY |
| OPTION 500×3 PAPER FEED UNIT B | A4 | PRESENT | NOT READY |
| OPTION 500×3 PAPER FEED UNIT C | A3 | PRESENT | NOT READY |
| NOTHING | — | — | — |

(134: rows 1–5; 135: rows 6–8)

| 1001 | 1002 | 1003 | 1004 |
|---|---|---|---|
| STANDARD FACE-DOWN PAPER EJECT UNIT | 250 | EMPTY | READY |
| OPTION 100×8 SORTER A | 100 | EMPTY | READY |
| OPTION 100×8 SORTER B | 100 | EMPTY | READY |
| OPTION 100×8 SORTER C | 100 | EMPTY | READY |
| OPTION 100×8 SORTER D | 100 | EMPTY | READY |
| OPTION 100×8 SORTER E | 100 | EMPTY | READY |
| OPTION 100×8 SORTER F | 100 | EMPTY | READY |
| OPTION 100×8 SORTER G | 100 | EMPTY | READY |
| OPTION 100×8 SORTER H | 100 | EMPTY | READY |
| NOTHING | — | — | — |

FIG. 23B

| 901 | 902 | 903 | 904 |
|---|---|---|---|
| | A4 | PRESENT | READY |
| | A3 | PRESENT | READY |
| | A4 | PRESENT | READY |
| | B4 | PRESENT | READY |
| | A3 | PRESENT | READY |
| | A4 | PRESENT | READY |
| | A4 | PRESENT | READY |
| | A3 | PRESENT | READY |
| | — | — | — |

| 1001 | 1002 | 1003 | 1004 |
|---|---|---|---|
| | 250 | EMPTY | READY |
| | 100 | EMPTY | READY |
| | 100 | EMPTY | READY |
| | 100 | EMPTY | READY |
| | 100 | EMPTY | READY |
| | 100 | EMPTY | READY |
| | 100 | EMPTY | READY |
| | 100 | EMPTY | READY |
| | 100 | EMPTY | READY |
| | — | — | — |

FIG. 23C

| 901 | 902 | 903 | 904 |
|---|---|---|---|
| | A4 | PRESENT | READY |
| | A3 | PRESENT | READY |
| | A4 | PRESENT | READY |
| | B4 | PRESENT | READY |
| | A3 | PRESENT | READY |
| | A4 | PRESENT | READY |
| | A4 | PRESENT | READY |
| | A3 | PRESENT | READY |
| | — | — | — |

| 1001 | 1002 | 1003 | 1004 |
|---|---|---|---|
| | 250 | EMPTY | NOT READY |
| | 100 | PRESENT | NOT READY |
| | 100 | EMPTY | NOT READY |
| | 100 | EMPTY | NOT READY |
| | 100 | EMPTY | NOT READY |
| | 100 | EMPTY | NOT READY |
| | 100 | EMPTY | NOT READY |
| | 100 | EMPTY | NOT READY |
| | 100 | EMPTY | NOT READY |
| | — | — | — |

FIG. 24A

| 901 | 902 | 903 | 904 |
|---|---|---|---|
| STANDARD UPPER STAGE PAPER FEED UNIT | A4 | PRESENT | READY |
| STANDARD LOWER STAGE PAPER FEED UNIT | A3 | PRESENT | READY |
| OPTION 500×3 PAPER FEED UNIT A | A4 | PRESENT | READY |
| OPTION 500×3 PAPER FEED UNIT B | B4 | PRESENT | READY |
| OPTION 500×3 PAPER FEED UNIT C | A3 | PRESENT | READY |
| OPTION 500×3 PAPER FEED UNIT A | A4 | PRESENT | NOT READY |
| OPTION 500×3 PAPER FEED UNIT B | A4 | PRESENT | NOT READY |
| OPTION 500×3 PAPER FEED UNIT C | A3 | PRESENT | NOT READY |
| NOTHING | — | — | — |

| 1001 | 1002 | 1003 | 1004 |
|---|---|---|---|
| STANDARD FACE-DOWN PAPER EJECT UNIT | 250 | EMPTY | READY |
| OPTION 100×8 SORTER A | 100 | EMPTY | READY |
| OPTION 100×8 SORTER B | 100 | EMPTY | READY |
| OPTION 100×8 SORTER C | 100 | EMPTY | READY |
| OPTION 100×8 SORTER D | 100 | EMPTY | READY |
| OPTION 100×8 SORTER E | 100 | EMPTY | READY |
| OPTION 100×8 SORTER F | 100 | EMPTY | READY |
| OPTION 100×8 SORTER G | 100 | EMPTY | READY |
| OPTION 100×8 SORTER H | 100 | EMPTY | READY |
| NOTHING | — | — | — |

FIG. 24B

| 901 | 902 | 903 | 904 |
|---|---|---|---|
| | A4 | PRESENT | READY |
| | A3 | PRESENT | READY |
| | A4 | PRESENT | READY |
| | B4 | PRESENT | READY |
| | A3 | PRESENT | READY |
| | A4 | PRESENT | READY |
| | A4 | PRESENT | READY |
| | A3 | PRESENT | READY |
| | — | — | — |

| 1001 | 1002 | 1003 | 1004 |
|---|---|---|---|
| | 250 | EMPTY | READY |
| | 100 | PRESENT | NOT READY |
| | 100 | PRESENT | NOT READY |
| | 100 | PRESENT | NOT READY |
| | 100 | PRESENT | NOT READY |
| | 100 | PRESENT | NOT READY |
| | 100 | PRESENT | NOT READY |
| | 100 | PRESENT | NOT READY |
| | 100 | PRESENT | NOT READY |
| | — | — | — |

FIG. 25

| 1501 | 1502 | 1503 | 1504 | 1505 | 1506 | 1507 |
|---|---|---|---|---|---|---|
| 1 | A4 | STANDARD UPPER STAGE CASSETTE | PRESENT | STANDARD FACE-DOWN PAPER EJECT UNIT | PRESENT | COMPLETE |
| 2 | A4 | STANDARD UPPER STAGE CASSETTE | PRESENT | STANDARD FACE-DOWN PAPER EJECT UNIT | PRESENT | COMPLETE |
| 3 | A4 | STANDARD UPPER STAGE CASSETTE | PRESENT | STANDARD FACE-DOWN PAPER EJECT UNIT | PRESENT | COMPLETE |
| 4 | A4 | STANDARD UPPER STAGE CASSETTE | PRESENT | STANDARD FACE-DOWN PAPER EJECT UNIT | PRESENT | INCOMPLETE |
| 5 | A3 | STANDARD LOWER STAGE CASSETTE | PRESENT | OPTION 100×8 SORTER A | PRESENT | INCOMPLETE |
| 6 | A3 | STANDARD LOWER STAGE CASSETTE | PRESENT | OPTION 100×8 SORTER A | PRESENT | INCOMPLETE |
| 7 | A4 | STANDARD UPPER STAGE CASSETTE | NOTHING | STANDARD FACE-DOWN PAPER EJECT UNIT | NOTHING | INCOMPLETE |
| 8 | A4 | OPTION PAPER FEED UNIT 1-A | NOTHING | STANDARD FACE-DOWN PAPER EJECT UNIT | NOTHING | INCOMPLETE |
| 9 | A4 | OPTION PAPER FEED UNIT 1-A | NOTHING | STANDARD FACE-DOWN PAPER EJECT UNIT | NOTHING | INCOMPLETE |
| 10 | A4 | OPTION PAPER FEED UNIT 1-A | NOTHING | STANDARD FACE-DOWN PAPER EJECT UNIT | NOTHING | INCOMPLETE |

| | 901 | 902 | 903 | 904 |
|---|---|---|---|---|
| STANDARD UPPER STAGE PAPER FEED UNIT | A4 | PRESENT | READY |
| STANDARD LOWER STAGE PAPER FEED UNIT | A3 | PRESENT | READY |
| OPTION 500×3 PAPER FEED UNIT A | A4 | PRESENT | READY |
| OPTION 500×3 PAPER FEED UNIT B | B4 | PRESENT | READY |
| OPTION 500×3 PAPER FEED UNIT C | A3 | PRESENT | READY |
| OPTION 500×3 PAPER FEED UNIT A | A4 | PRESENT | NOT READY |
| OPTION 500×3 PAPER FEED UNIT B | A4 | PRESENT | NOT READY |
| OPTION 500×3 PAPER FEED UNIT C | A3 | PRESENT | NOT READY |
| NOTHING | — | — | — |

(134: rows 3–5; 135: rows 6–8)

| | 1001 | 1002 | 1003 | 1004 |
|---|---|---|---|---|
| STANDARD FACE-DOWN PAPER EJECT UNIT | 250 | EMPTY | READY |
| OPTION 100×8 SORTER A | 100 | EMPTY | NOT READY |
| OPTION 100×8 SORTER B | 100 | EMPTY | NOT READY |
| OPTION 100×8 SORTER C | 100 | EMPTY | NOT READY |
| OPTION 100×8 SORTER D | 100 | EMPTY | NOT READY |
| OPTION 100×8 SORTER E | 100 | EMPTY | NOT READY |
| OPTION 100×8 SORTER F | 100 | EMPTY | NOT READY |
| OPTION 100×8 SORTER G | 100 | EMPTY | NOT READY |
| OPTION 100×8 SORTER H | 100 | EMPTY | NOT READY |
| NOTHING | — | — | NOT READY |

PRINTING APPARATUS AND CONTROL DEVICE FOR OPTION EQUIPMENT CONNECTED THERETO

BACKGROUND OF THE INVENTION

1. Field of the Invention

The present invention relates to a printing apparatus, and more particularly a printing apparatus constituted by connecting an optional sheet feed unit (for example, a paper deck option unit) and a sheet ejecting unit (for example, sorter unit) to a main body of the printing apparatus and a device for controlling such connected optional equipment.

Also the present invention relates to a printing apparatus capable of printing by receiving text data from an external equipment such as a host computer, and more particularly to a printing apparatus capable of optimum selection of the sheet feed unit and the sheet discharge unit, and a control device for controlling the connected optional equipment.

2. Related Background Art

The conventional printing apparatus, such as a laser beam printer employing an electrophotographic process is constructed as shown in FIG. 27, in which a main body 201 of the image recording apparatus is provided with a video controller 202 and an engine controller 203 to be explained in the following.

The video controller 202 principally effects control relating to the image processing, and develops the image information, sent from an external apparatus (not shown) such as a personal computer through a general-use interface such as Centronics interface, into bit data. The engine controller 203 principally effects control on charging, exposure, development, image transfer, image fixing and sheet transfer relating to the electrophotographic process. A video interface 204 connects the video controller 202 and the engine controller 203, for enabling mutual communication.

A paper deck optional unit 205 stores a large amount of recording sheets, and supplies the printing apparatus 201 with the recording sheets, in response to an instruction from the engine controller 203. A paper deck interface 206 connects the engine controller 203 and the paper deck optional unit 205, for enabling mutual communication.

A sorter optional unit 207 is provided with plural stacker trays, and sorts the recorded sheets, coming out of the printing apparatus 201 into these trays according to an instruction from the engine controller 203. A sorter interface 208 connects the engine controller 203 and the sorter optional unit for enabling mutual communication.

In the above-explained configuration, upon receiving the image information and the print command from the external apparatus, the video controller 202 sends, through the video interface 204, a video signal, converted into bit data from the image information, and the print command to the engine controller 203. The video controller 202 also sends instructions on the use of the paper deck optional unit 205 and the sorter optional unit 207, based on an instruction of the user, entered from an operation panel (not shown) connected to the external apparatus or the video controller 202.

Then the engine controller 203 effects image recording based on the received video signal, by controlling components relating to the charging, exposure, image development, image transfer, image fixing and sheet transfer in the electrophotographic process, incorporated in the printing apparatus 201. Also at the same time, in response to an instruction from the video controller 202, it gives instructions on the sheet feed timing, etc. by controlling the paper deck optional unit 206 through the paper deck interface 206, and on the sheet sorting by controlling the sorter optional unit through the sorter interface 208.

However, such conventional configuration has been associated with the following drawbacks.

In the conventional configuration mentioned above, the engine controller and each optional unit are connected to one-to-one fixed relationship. For this reason, in order to increase the functions of the optional unit, it is necessary to improve the ability of the engine controller.

In recent years, the situation in which the electronic recording apparatus is used has become diversified, and it is therefore desired to expand the functions of the optional units and to freely combine various optional units. However, for enabling control on various optional units in the conventional configuration, the engine controller becomes costly as it has to control various objects in addition to the control on the electrophotographic process, and such additional cost is completely unnecessary for the user who does not use the optional units.

Also there has not been appropriate management among the data transferred from the host computer, the sheet feeding means and the sheet ejecting means for the sheets used for printing such data. For this reason, in case of recovery printing of several previous pages for the purpose of jam recovery, the sheet feed means and the sheet ejecting means are not necessarily same as those used prior to the occurrence of jamming, and the recovery print data have to be resent from the host computer in case special sheets such as colored sheets are employed or in case the sheet ejecting address is specified.

Also in case the sheet feed or ejecting unit is added as an option, the engine controller is required to have a high-performance CPU in order to effect control including such optional unit.

Furthermore, the information on such sheet feed or ejecting unit, such as the information on the time required for sheet feeding or ejecting in such unit, is not managed, and the selection of the sheet feed or ejecting unit is made by a default setting or a setting from the external apparatus. For this reason it has not been possible to achieve the printing operation within the shortest printing time.

SUMMARY OF THE INVENTION

In consideration of the foregoing, the object of the present invention is to provide a printing apparatus provided, between the video controller and the engine controller, with a supervisory controller for collectively controlling plural optional units and also giving instructions to the engine controller, wherein instructions are given from the video controller to the supervisory controller whereby various optional units can be used without cost increase in the engine controller.

The above-mentioned object can be attained, according to the present invention, by a printing apparatus provided with a main body including a video controller with control means and video signal generation means for generating a video signal from the image information based on a recording command from the external apparatus, and a supervisory controller including option unit control means for controlling at least an optional unit connectable to the main body, wherein the video controller comprises process time informing means for informing the supervisory controller of the image developing process time, and the supervisory controller comprises paper transport time memory means for storing the paper transport time from an optional paper feeding source to the entrance of the printing apparatus, comparator means for comparing the process time informed from the process time informing means with the paper transport time stored in the paper transport time memory means, and paper feed source altering means for altering the paper feed source in case the comparator means identifies that the above-mentioned process time is shorter.

The video controller is provided with process order alteration means for varying the order of process of plural data received from the external apparatus in order that the sheet transportation can be continued without interruption, and informing means for informing the external apparatus of the alteration of the order of process by the process order alteration means.

The video controller is provided with designation means for setting, in the supervisory controller, the information on the paper/paper feeding for the data received from the external apparatus, while the supervisory controller is provided with paper feed information determination means for determining the paper feed information from the information set by the designation means and from the status of the optional unit, and the video controller is further provided with paper feed information detection means for detecting the paper feed information determined by the paper feed information determination means of the supervisory controller and paper feed information informing means for informing the external apparatus of the paper feed information detected by the paper feed information detection means.

The supervisory controller is provided with paper feed start detection means for detecting the start of paper feeding in the optional unit, position information detecting means for detecting the paper position information in the optional unit, paper ejecting end detection means for detecting the end of paper ejecting in the optional unit, and informing means for informing the video controller of the information on the paper feed start, position and paper ejecting end detected by the foregoing detection means, and the video controller is provided with informing means for informing the external apparatus of the information from the informing means.

Also the supervisory controller is provided with path judgment means for judging, in case of paper jamming, whether there is a path allowing the printing process without going through the point of paper jamming, and continuation informing means for informing the video controller of a fact that the printing process can be continued in case the path judgment means identifies the presence of a path enabling the printing process, and the video controller is adapted to continue the printing process through the available path after the reception of the information from the continuation informing means.

The supervisory controller is further provided with table alteration means for rearranging the page management table for the already fed papers in the optional unit, in case the path judgment means identifies the presence of the path allowing the printing process, and the printing process is continued from the page changed by the table alteration means.

There is further provided test print means for printing, on the test print, the information on the jam position, when the operator executes the test print as a utility function of the printing apparatus in case the path judgment means identifies the presence of the path allowing the printing process.

There are also provided paper feed means for effecting paper feeding from all the connected paper feed optional units and paper ejecting means for effecting paper ejecting from all the connected paper ejecting optional units, when the operator executes the test print as a utility function of the printing apparatus.

Also according to the present invention, the paper feed means and the paper ejecting means, including the optional units, are managed by the video controller having the CPU of a higher performance, and, for this purpose, a table for managing the information on the paper feeding and the paper ejecting is provided in the video controller. This management table enables reproduction of the paper feeding and ejecting route in case of jam recovery and selection of the paper feeding and ejecting route realizing shortest printing. Also the printing operation is enabled in case at least a paper feeding and ejecting route is ready on the management table, even if all the paper feeding and ejecting means are not ready.

BRIEF DESCRIPTION OF THE DRAWINGS

FIG. 19 is a view showing a paper feed management table;

FIG. 20 is a view showing a paper ejecting management table;

FIGS. 21A and 21B are views showing movement in the paper feed management table;

FIGS. 22A to 22C are views showing movement in the paper ejecting management table;

FIGS. 23A, 23B, 23C, 24A and 24B are views showing movement in the paper feed/ejecting management tables;

FIG. 25 is a view showing an example of a table for managing the relationship between the papers and the paper feed/ejecting means;

FIG. 26 is a view showing another example of the paper feed/ejecting management table.

DETAILED DESCRIPTION OF THE PREFERRED EMBODIMENTS

Now, the present invention will be clarified in detail by preferred embodiments thereof shown in the attached drawings.

Figure 1:
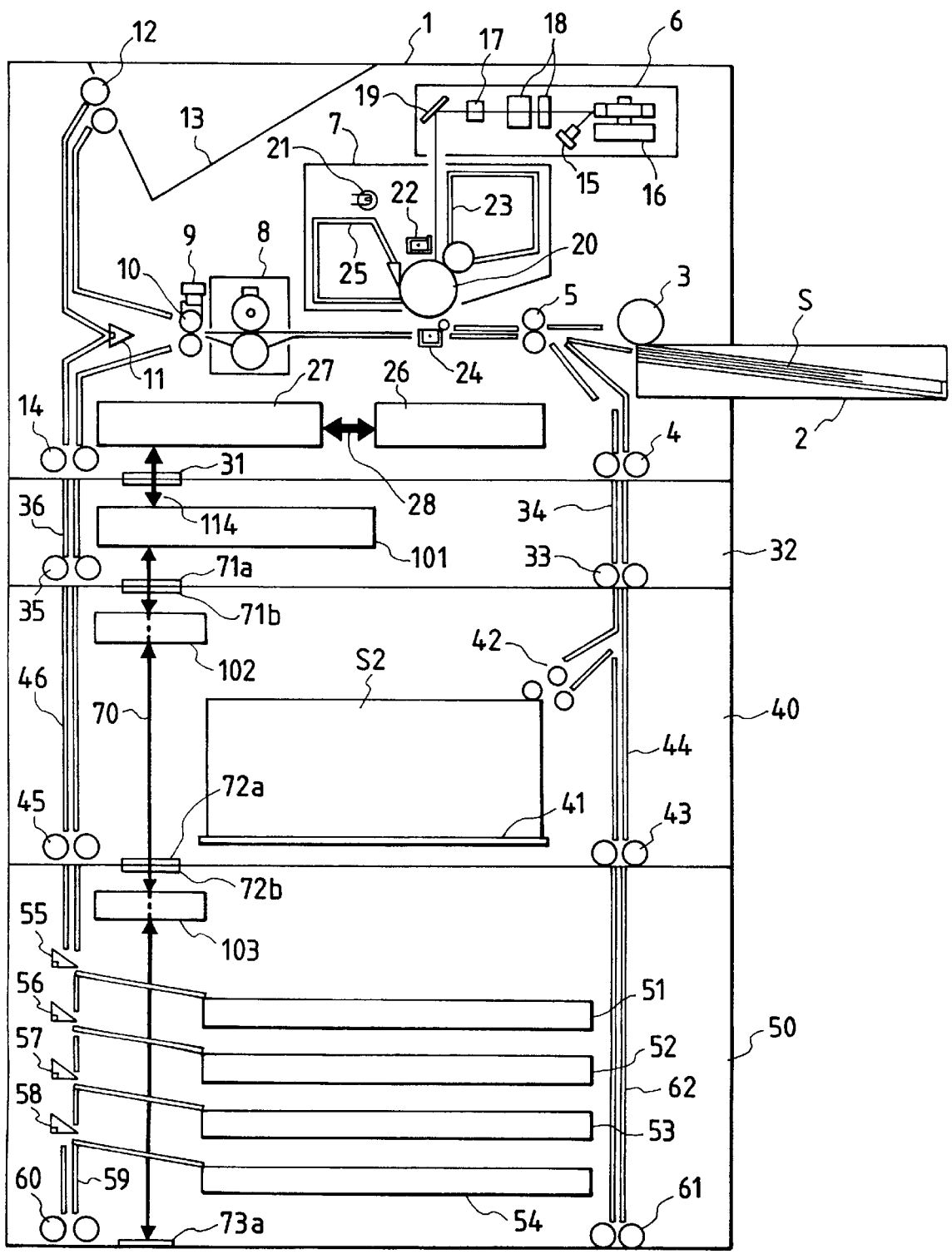
FIG. 1 is a view showing the configuration of a printing apparatus and optional units embodying the present invention.

FIG. 1 is a view showing the configuration of a printing apparatus embodying the present invention, in case, as an example, of a laser beam printer. However, the present embodiment is applicable not only to such laser beam printer but also to the printers of other types, such as an ink jet printer. In the following there will be explained and illustrated the connection of two optional units, but there may also be connected a larger number of optional units. In the following there will be given an explanation on the configuration and the function thereof.

[Configuration of main printing apparatus and optional units]

Referring to FIG. 1, there is shown a main body 1 of the printing apparatus, for example a laser beam printer. A recording sheet S, contained in a cassette 2, is fed into the main body 1 by means of a feed roller 3. Feed rollers 4 feeds a recording sheet. S, fed from a paper feed optional unit to be explained later, into the main body 1. At the downstream side of the feed roller 3 and the optional sheet feed rollers 4, there are provided paired registration rollers 5 for synchronized transportation of the recording sheet S, and, at the downstream side thereof, provided is an image recording unit 7 for forming a toner image on the sheet S by means of a laser beam emitted from a laser scanner unit 6.

At the downstream side of the image recording unit 7 there is provided a fixing unit 8 for thermally fixing the toner image formed on the recording sheet S, and, at the downstream side thereof, there are provided a paper ejecting sensor 9 for detecting the paper transport status of the paper ejecting unit, transport rollers 10 for transporting the recording sheet S, a flapper 11 for switching the direction of transportation of the recording sheet S already subjected to recording etc. By the function of the flapper 11, the recording sheet S is either stacked on a stacker tray 13 through the ejecting rollers 12 or transported to optional ejecting rollers 14 toward the paper ejecting optional unit.

A laser scanner 6 is composed of a laser unit 15 for emitting a laser beam modulated according to an image signal VDO transmitted from a video controller 27 to be explained later, a polygon motor 16 for driving a polygon mirror for scanning a photosensitive drum 20 with the laser beam from the laser unit 15, a beam detector 17 for detecting the position of the laser beam in the scanning direction, focusing lenses 18, a deflecting mirror 19, etc. The above-mentioned image recording unit 7 is composed of components necessary in the known electrophotographic process, such as a photosensitive drum 20, a pre-exposure lamp 21, a primary charger 22, a developing unit 23, a transfer charger 24, a cleaner 25, etc.

An engine controller 26 controls the electrophotographic process by the laser scanner 6, the image recording unit 7 and the fixing unit 8, and the transportation of the recording sheet in the main body 1. A video controller 27, connected with the external apparatus (not shown) such as a personal computer through a general interface (such as Centronics or RS232C), develops the image information, transmitted through the interface, into bit data and sends thus developed bit data, as the signal VDO, to the engine controller 26. A video interface 28 enables communication between the video controller 27 and the engine controller 26.

In the following there will be explained the optional units detachably connected to the main body 1.

An option supervisory unit 32 is provided with a supervisory controller 101 which supervises various optional units and which is connected to the video controller 27 through a supervisory interface 114 connected by a connector 31. It is also provided with relay transport rollers 33 and a relay transport path 34 for relaying the paper transportation from the paper feed optional unit, and relay transport rollers 35 and a relay transport path 36 for relaying the paper transportation to the paper ejecting optional unit.

A paper deck optional unit 40, containing a large amount of recording sheets S2, is provided with a vertically movable paper deck 41 and feeds the recording sheets S2 stacked thereon when required, by means of paper deck feed rollers 42. It is further provided with relay transport rollers 43 and a relay transport path 44 for relaying the paper transportation from another paper feed optional unit, and relay transport rollers 45 and a relay transport path 46 for relaying the paper transportation to the paper ejecting optional unit. The paper deck optional unit 40 is controlled by a paper deck controller 102.

A sorter optional unit 50 is provided with a first bin 51, a second bin 52, a third bin 53 and a fourth bin 54 for sorted ejecting of the recorded sheets S. The sorting of the sheets S into these bins is conducted by a first flapper 55, a second flapper 56, a third flapper 57 and a fourth flapper 58. It is further provided with relay transport rollers 61 and a relay transport path 62 by relaying the paper transportation from the paper feed optional unit, and relay transport rollers 60 and a relay transport path 59 for relaying the paper transportation to another paper ejecting optional unit. The sorter optional unit 50 is controlled by a sorter controller 103.

The supervisory controller 101 is connected with the paper deck controller 102 and the sorter controller 103 by an optional unit interface 70, connected by connectors 71a, 71b, 72a and 72b. The connectors 71a, 72a, 73a are mutually same, while the connectors 71b, 72b are also mutually same, so that the paper deck optional unit 40 and the sorter optional unit 50 may be mutually inverted in their positions.

[Connection of the main body and the optional units of the printing apparatus and configuration of the control system]

Figure 2:
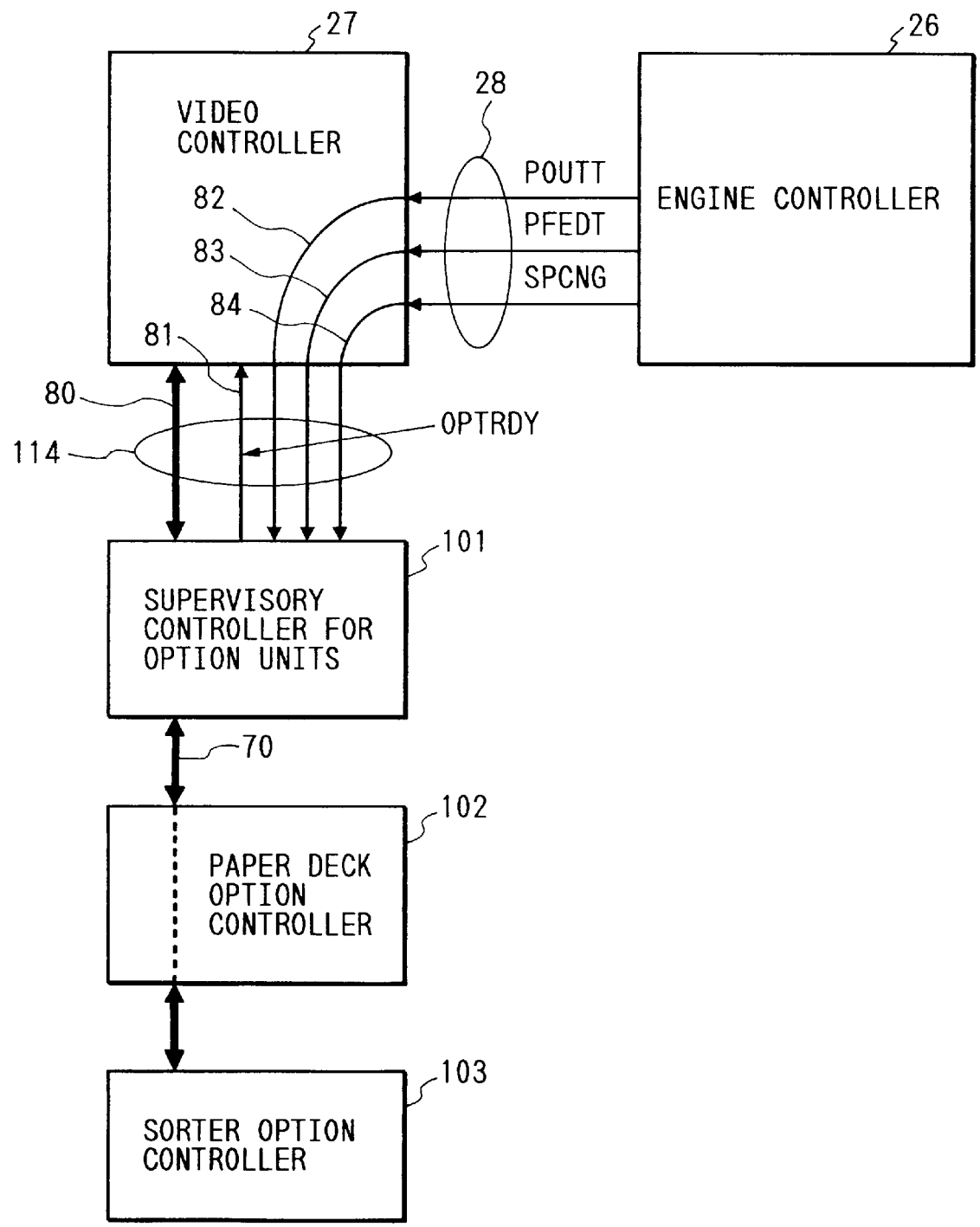
FIG. 2 is a view showing connections relating to the control of the printing apparatus and the optional units embodying the present invention.

FIG. 2 is a block diagram showing an example of connection of the controllers.

The supervisory interface 114 is composed of a serial communication interface line 80, and four signal lines for an OPTRDY signal 81, a POUTT signal 82, a PFEDT signal 83 and a SPCNG signal 84.

The serial communication interface 80 is used for transmitting commands from the video controller 27, such as a paper feed instruction to the paper deck optional unit 40 or a designation of the ejecting bin to the sorter optional unit 50, and statuses from the supervisory controller 101 such as a paper status in the paper deck optional unit 40 or a stack status of the bins in the sorter optional unit 50. The supervisory controller 101 and the video controller 27 may also be connected directly by a CPU bus.

The OPTRDY signal 81 indicates whether the optional unit designated by the video controller 27 is in a usable state. The POUTT signal 82 is a timing signal of paper ejecting by the main body 1. The PREDT signal 83 indicates the timing of reception of the recording sheet by the main body 1 from the optional unit. The SPCNG signal 84 is to decelerate the recording sheet S, transported at a high speed in the optional unit, in order to match the transportation speed in the main body 1. The POUTT signal 82, the PFEDT signal 83 and the SPCNG signal 84 are released from the engine controller 26 and supplied to the supervisory controller 101 through the video interface 28 and the video controller 27.

In the configuration shown in FIGS. 1 and 2, upon receiving the image information and the print command from the external apparatus (not shown) such as a personal computer, the video controller 27 transmits these through the video interface 28 to the engine controller 26, which in response records an image on the recording sheet S based on the VDO signal by controlling the components involved in the electrophotographic process, and generates the POUTT signal, PFEDT signal and SPCNG signal at predetermined timings in synchronization with the paper transportation. On the other hand, the video controller 27 transmits the paper feed instruction to the paper deck optional unit 40 and the paper ejecting instruction and the ejecting bin designation to the sorter optional unit 50 to the supervisory controller 101 through the serial communication interface 80.

The supervisory controller 101 supervises the paper transportation in the optional units by controlling the paper deck controller 102 and the sorter controller 103 through the optional unit interface 70, based on the instruction from the video controller 27 and the status of other signals, received through the supervisory interface 114.

The above-explained configuration (FIGS. 1 and 2) is common in the following embodiments 1 to 8.

[First Embodiment]

In the following there will be explained, with reference to a flow chart in FIG. 3, the paper feed control in a first embodiment of the above-explained configuration.

It is assumed that a large amount of recording sheets of a same size is stored in the cassette 2 and the paper deck optional unit 40.

Figure 3:
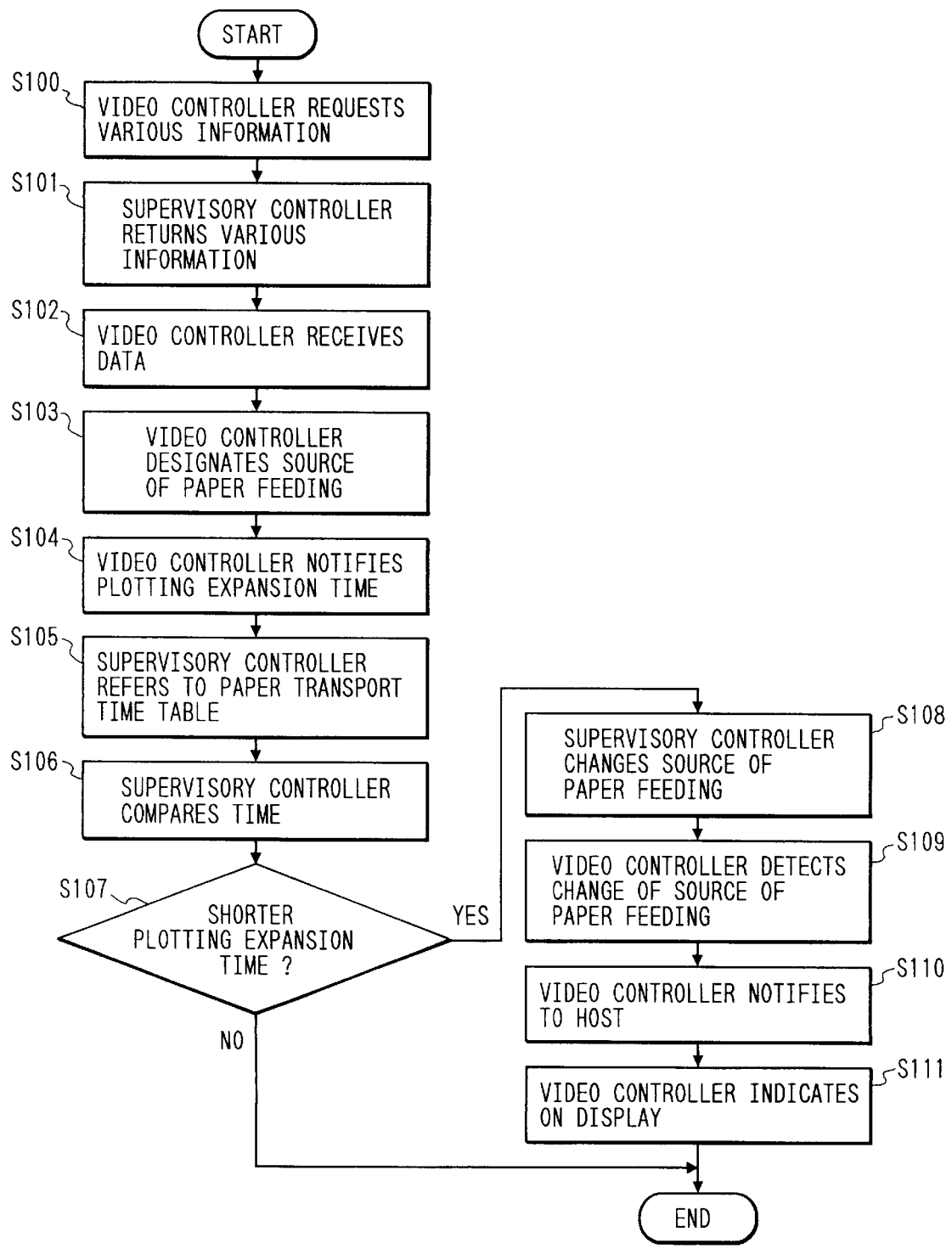
FIG. 3 is a flow chart showing the control sequence of the printing apparatus and the optional units constituting a first embodiment of the present invention.

Referring to FIG. 3, at first in a step S100, the video controller 27 sends, to the supervisory controller 101, a command requesting the status of connection of the optional units and of recording sheets.

In a step S101, the supervisory controller 101 returns a status of the optional units to the video controller 27.

In a step S102, the video controller receives data from the host computer (not shown), and it is assumed that the paper deck optional unit 40 is designated as the source of paper feeding in the data.

In a step S103, the video controller 27 sends a command, designating the paper deck optional unit 40 as the source of paper feeding, to the supervisory controller 101, and, in a step S104, it releases a command indicating an image development process time (a plotting expansion time).

In S105, the supervisory controller 101 refers to a paper transport time table prepared in advance, and a step S106 compares the informed image development process time with the time required for paper transportation from the feed rollers 42 of the paper deck optional unit to the optional feed rollers 4 in the main body. If a step S107 identifies that the former is shorter, a step S108 selects the paper feeding from the cassette 2.

In S109, the video controller 27 detects the status of alteration of the paper feed source by the supervisory controller 101.

In a step S110, the video controller 27 informs the host computer (not shown) of the alteration of the paper feed source, and effects a corresponding display in a display unit (not shown) of the main body in a step S111.

On the other hand, if the step S107 identifies that the informed image development process time is longer, the process is executed without the change of the paper feed source.

This embodiment describes the selection of the paper feed source between the cassette 2 and the paper deck optional unit 40, but it is naturally applicable also in case paper deck optional units are additionally connected or in case the number of cassettes is increased in the main body.

[Second Embodiment]

In the following there will be explained, with reference to a flow chart in FIG. 4, the paper feed control in a second embodiment of the aforementioned configuration.

It is assumed that a large amount of recording sheets of a same size is contained in the cassette 2 and the paper deck optional unit 40, and that the host computer (not shown) transmits two data (data A and data C) designating the paper deck optional unit 40 as the paper feed source and data (data B) designating the cassette 2 as the paper feed source. It is also assumed that the designated paper size coincides with the size of the loaded sheets.

Figure 4:
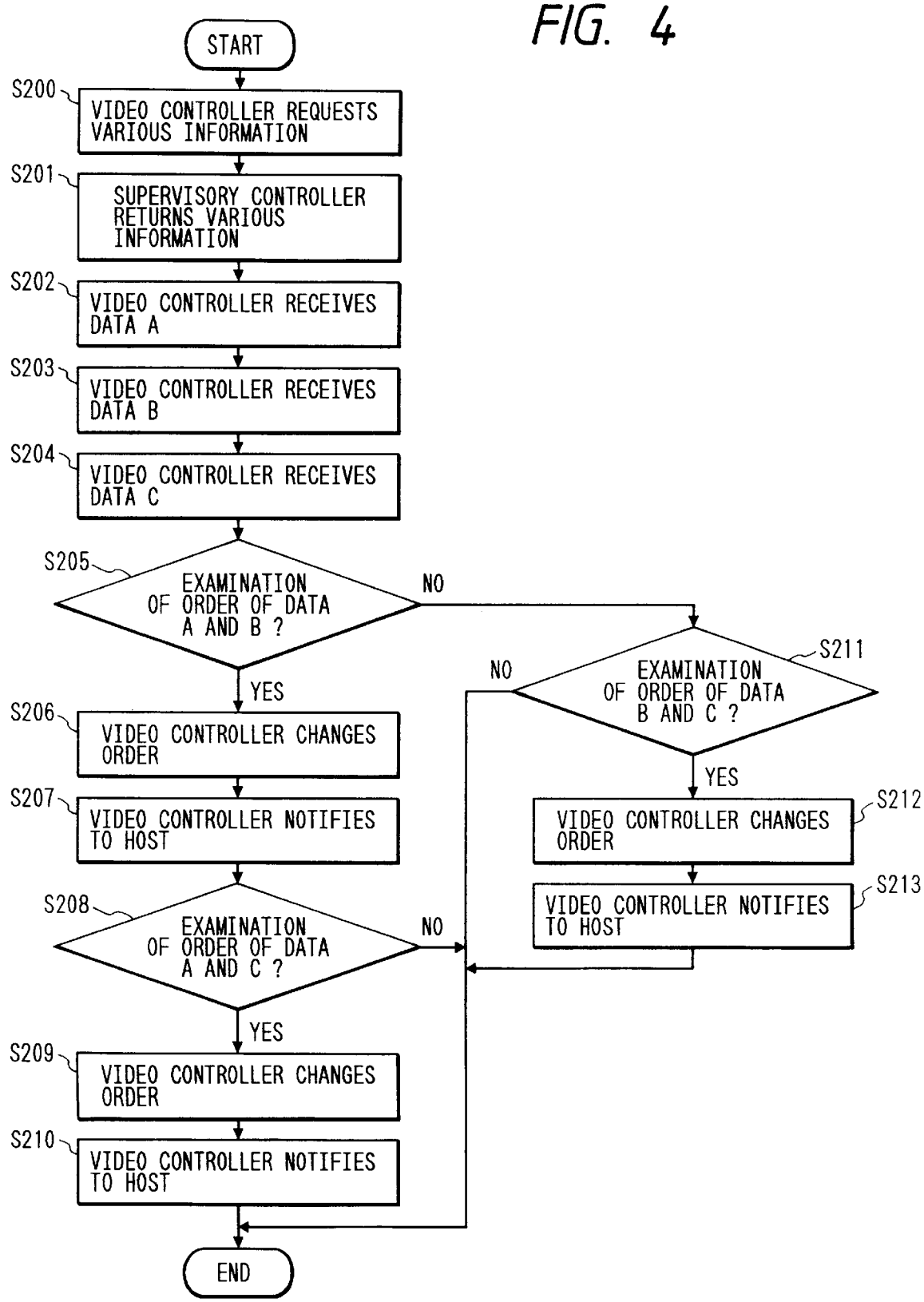
FIG. 4 is a flow chart showing the control sequence of the printing apparatus and the optional units constituting a second embodiment of the present invention.

Referring to FIG. 4, at first in a step S200, the video controller 27 sends, to the supervisory controller 101, a command requesting the status of connection of the optional units and of recording sheets.

In a step S201, the supervisory controller 101 returns a status of the optional units to the video controller 27.

Then, the video controller 27 receives data A in a step S202, data B in S203 and data C in S204 from the host computer (not shown).

Based on the status of the optional units, the video controller 27 changes the order of data processing in the following manner, so as to reduce the entire print time and to effect paper feeding in continuous manner.

A step S205 investigates the change of order of processing of the data A and the data B. As the paper transport time from the paper feed source to the printing apparatus is shorter for the data B, a step S206 alters the order of processing, and, in a step S207, the video controller 27 informs the host computer (not shown) of the change in the order of data processing.

Similarly, a step S208 investigates the change in the order of processing of the data A and the data C. The order is not changed because both data have the same paper feed source.

If the result of the step S205 is contrary to the above-mentioned case, a step S211 investigates the change of the order of processing of the data B and C, and, if the change is possible, a step S212 changes the order and a step S213 informs the host computer (not shown) of the change of the order of data processing.

If the result of the step S208 is contrary to the above-mentioned case, a step S211 investigates the change of the order of processing of the data A and C, and, if the change is possible, a step S209 changes the order and a step S210 informs the host computer of the change of the order of data processing.

Consequently, in the present embodiment,. the data are processed in the order of B, A and C.

This embodiment describes the selection of the paper feed source between the cassette 2 and the paper deck optional unit 40, but it is naturally applicable also in case paper deck optional units are additionally connected or in case the number of cassettes is increased in the main body.

[Third Embodiment]

In the following there will be explained, with reference to a flow chart in FIG. 5, the paper feed control in a third embodiment of the foregoing configuration.

It is assumed that the cassette 2 contains 3 sheets of A4 size while the paper deck optional unit 40 contains 10 sheets of A4 size, and that the host computer (not shown) sends data designating 10 A4-sized sheets without designation of the paper feed source.

Figure 5:
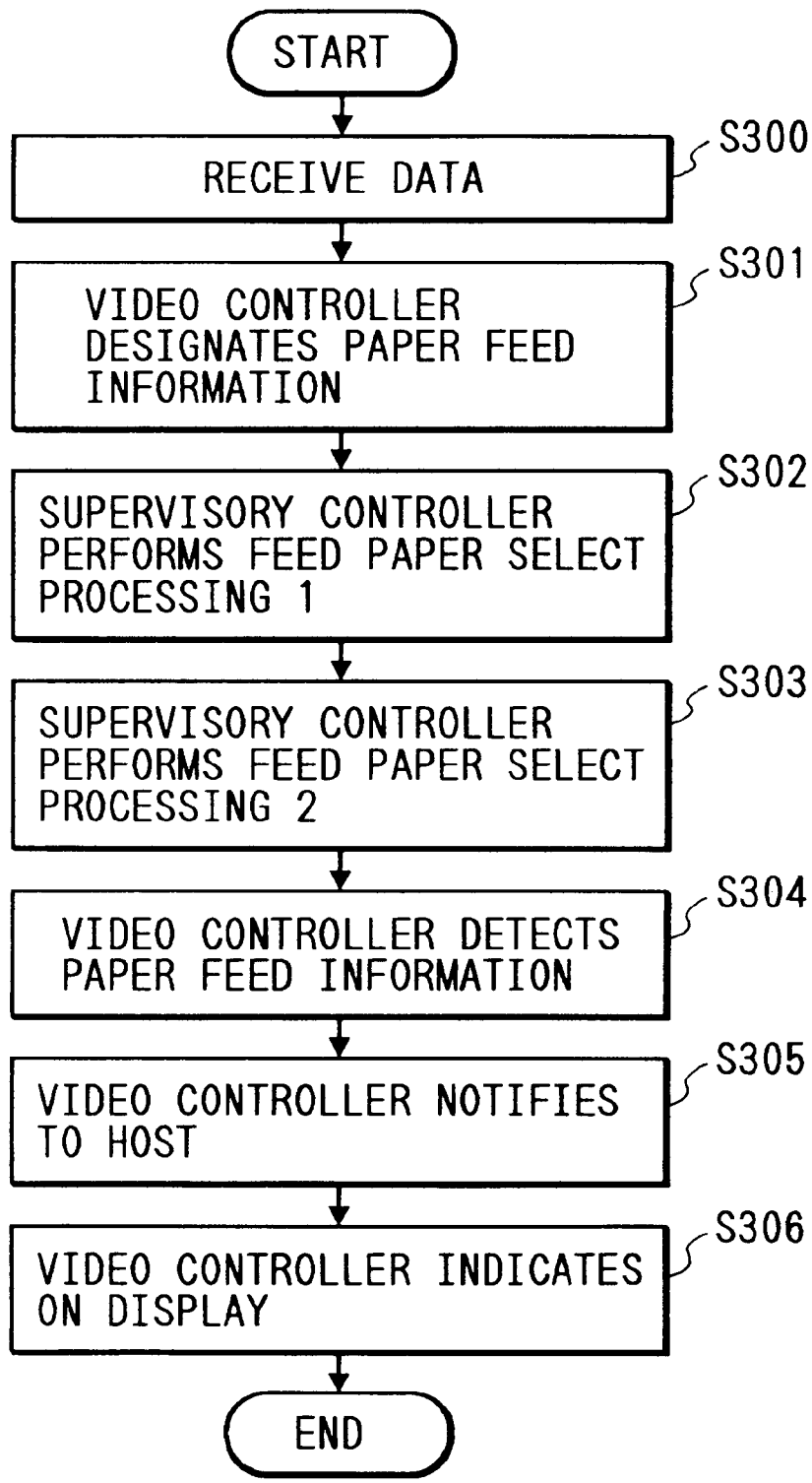
FIG. 5 is a flow chart showing the control sequence of the printing apparatus and the optional units constituting a third embodiment of the present invention.

Referring to FIG. 5, at first in a step S300, the video controller 27 of the main body receives the data from the host computer.

In a step S301, the video controller 27 sends a command, for setting the paper feed information, to the supervisory controller 101.

Identifying that the sheet size is same as that in the cassette 2 and the paper deck optional unit 40 and that the paper feed source is not specified, the supervisory controller 101 effects, in a step S302, the paper feeding for the first three pages from the cassette 2, and, in a step S303, the paper feeding for the remaining seven pages from the paper deck optional unit 40.

In a step S304, the video controller 27 detects the paper feed information of the supervisory controller 101.

Then, it informs the host computer of the paper feed information in a step S305 and display corresponding information on a display (not shown) of the main body in a step S306.

This embodiment describes the selection of the paper feed source between the cassette 2 and the paper deck optional unit 40, but it is naturally applicable also in case paper deck optional units are additionally connected or in case the number of cassettes is increased in the main body.

[Fourth Embodiment]

In the following there will be explained, with reference to a flow chart in FIG. 6, the paper transport control in a fourth embodiment of the foregoing configuration.

Figure 6:
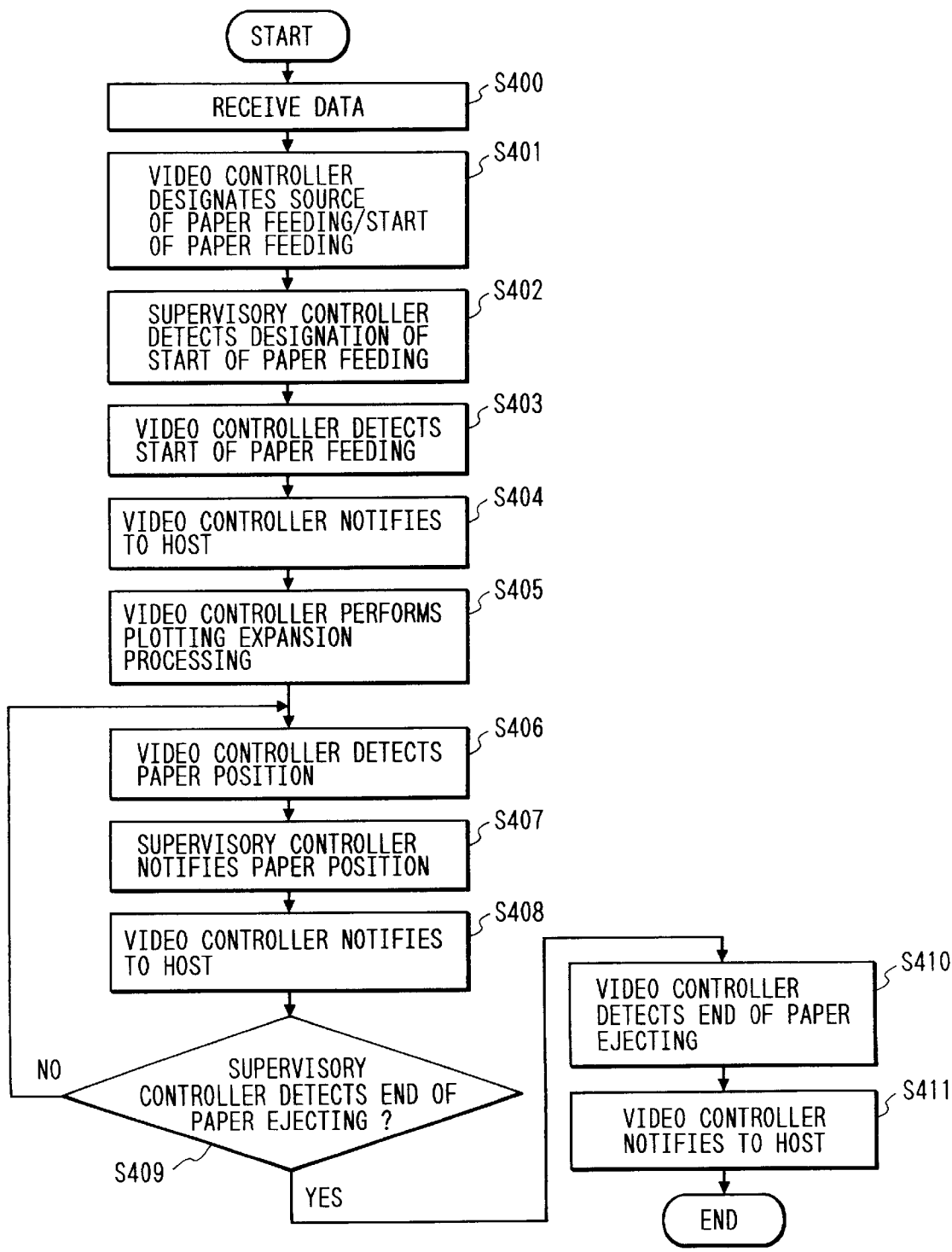
FIG. 6 is a flow chart showing the control sequence of the printing apparatus and the optional units constituting a fourth embodiment of the present invention.

Referring to FIG. 6, at first in a step S400, the video controller 27 of the main body receives data from the host computer (not shown).

In a step S401, the video controller 27 sends, to the supervisory controller 101, a command for designating the paper deck optional unit 40 as the paper feed source and a paper feed start command.

It is assumed that the sheet size designated in the data is same as the size of the loaded sheets.

In a step S402, the supervisory controller 101 detects the start of paper feeding, and, in a step S403, the video controller 27 detects the start of paper feeding by the supervisory controller 101.

The video controller 27 informs the host computer of the start of paper feeding in a step S404, and executes image development in a step S405. In the meantime, in a step S406, it periodically sends to the supervisory controller 101 a command for obtaining the information on the paper position.

In a step S407, the supervisory controller 101 returns, to the video controller 27, a status indicating the passing of the paper through a sensor (not shown) in the transport path, when such passing takes place.

In a step S408, the video controller 27 informs the host computer of the current paper position.

The supervisory controller 101 detects the end of paper ejecting in a step S409, and the video controller 27 detects the end of paper ejecting by the supervisory controller 101 in a step S410.

Then, in a step S411, it informs the host computer of the end of paper ejecting.

If the step S409 is unable to detect the end of paper ejecting, the sequence returns to the step S406 and is repeated until the end of paper ejecting is detected.

This embodiment describes a case where the paper feed source is the paper deck optional unit 40, but it is naturally applicable also when additional paper deck optional units are connected.

[Fifth Embodiment]

In the following there will be explained, with reference to a flow chart in FIG. 7, the paper transport controller in a fifth embodiment of the aforementioned configuration.

It is assumed that a large amount of papers of a same size is contained in the cassette 2 and the paper deck optional unit 40, and that the host computer (not shown) sends data in which the paper feed source is designated as the paper deck optional unit 40.

Figure 7:
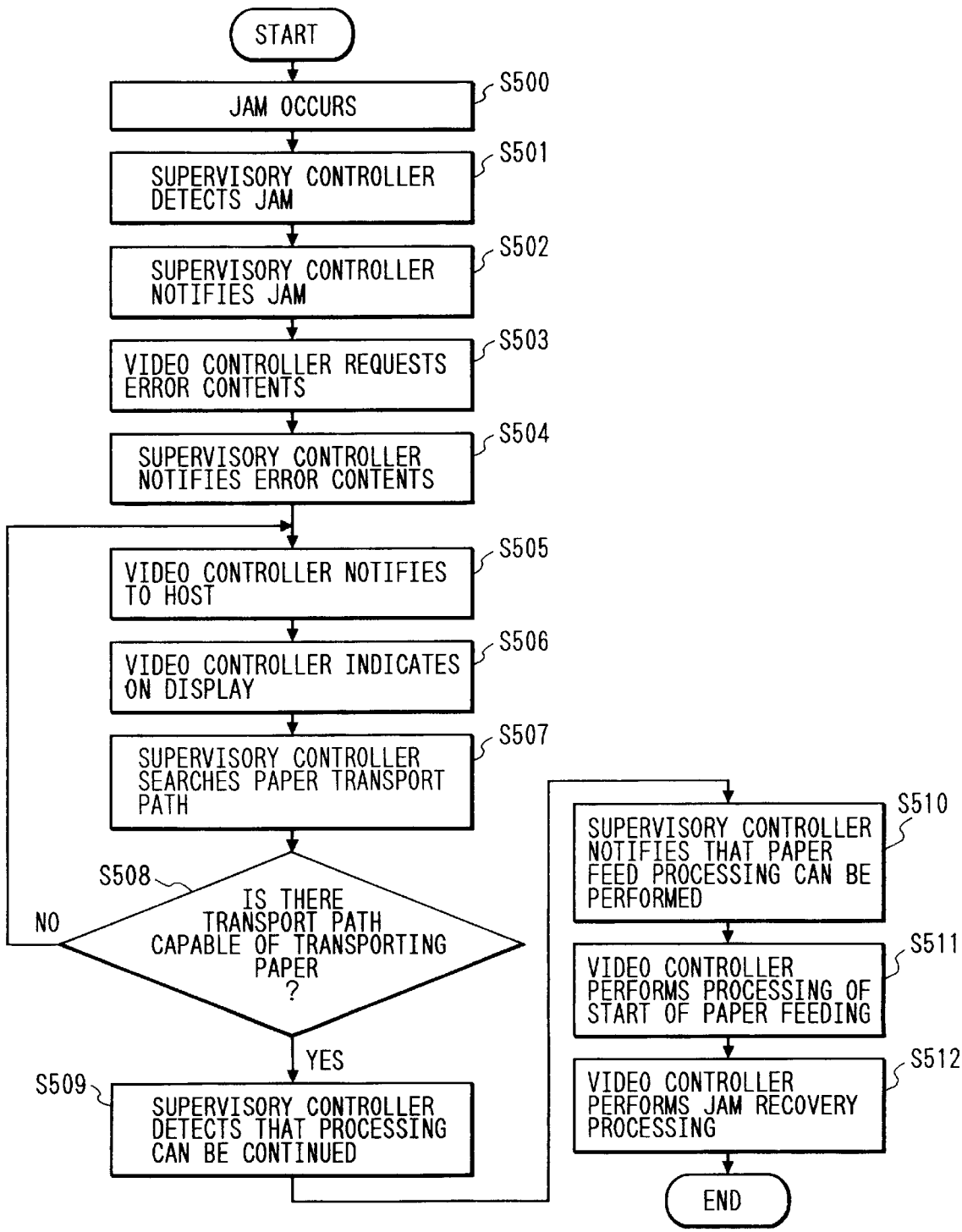
FIG. 7 is a flow chart showing the control sequence of the printing apparatus and the optional units constituting a fifth embodiment of the present invention.

Referring to FIG. 7, it is assumed that, in a step S500, a jamming occurs in the relay transport path 34 from the paper deck optional unit 40.

The supervisory controller 101 detects the position of the jam in a step S501 and informs the video controller 27 of the presence of the error in a step S502.

In a step S503, the video controller 27 sends, to the supervisory controller 101, a command requesting the content of the error.

In a step S504, the supervisory controller 101 returns, to the video controller 27, a status indicating the occurrence of the jam and the position thereof.

The video controller 27 informs, in a step S505, the host computer of the occurrence of the jam and effects a corresponding display on a display unit (not shown) of the main body, in a step S506.

In a step S507, the supervisory controller 101 searches a transport path enabling paper feeding and ejecting.

If a step S508 identifies presence of such path, a step S509 detects, in this case, that the paper feeding is possible from the cassette 2. Then a step S510 informs the video controller 27 that the process can be continued, and a step S511 initiates the paper feeding from the cassette 2.

In a step S512, in response to the information from the supervisory controller 101, the video controller 27 executes a jam recovery process.

If the step S508 identifies absence of the transport path enabling paper feeding and ejecting, the sequence returns to steps S505, S506 to request the removal of the jammed paper to the operator.

This embodiment describes the selection of the paper feed source between the cassette 2 and the paper deck optional unit 40, but it is naturally applicable also to a case in which additional paper deck optional units are connected or in a case in which the number of the cassettes in the main body is increased.

[Sixth Embodiment]

In the following there will be explained, with reference to a flow chart in FIG. 8, the paper transport control of a sixth embodiment of the aforementioned configuration.

It is assumed that a large amount of papers of a same size is contained in the cassette 2 and the paper deck optional unit 40, and that the host computer (not shown) transmits data designating the paper deck optional unit 40 as the paper feed source.

Figure 8:
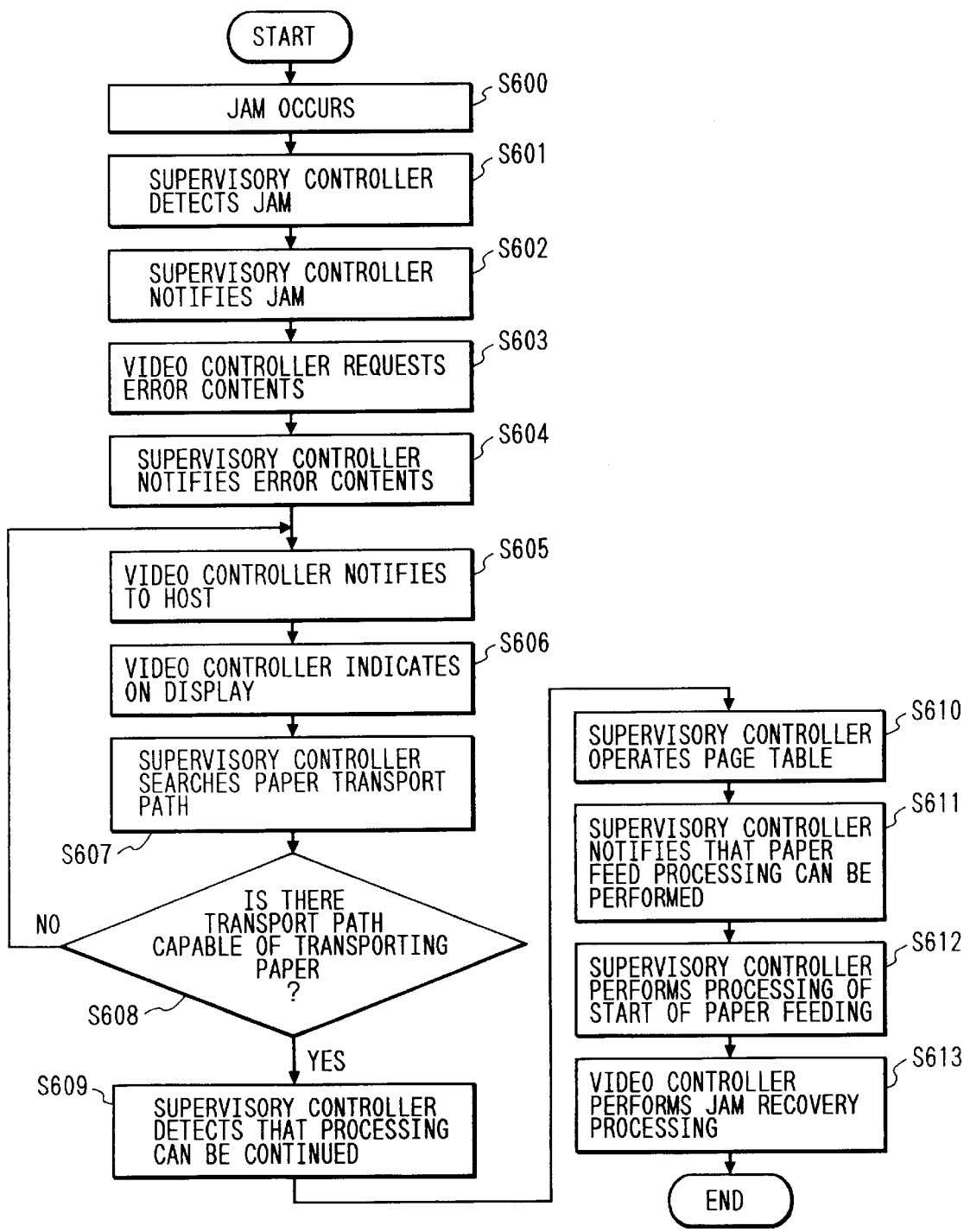
FIG. 8 is a flow chart showing the control sequence of the printing apparatus and the optional units constituting a sixth embodiment of the present invention.

Referring to FIG. 8, it is assumed that, in a step S600, a jam occurs in the feed rollers 42 of the paper deck optional unit 40.

The supervisory controller 101 detects the position of the jam in a step S601, and informs the video controller 27 of the occurrence of an error in a step S602.

In a step S603, the video controller 27 sends, to the supervisory controller 101, a command requesting the content of the error.

In a step S604, the supervisory controller 101 returns, to the video controller 27, a status indicating the occurrence of jam and the position thereof.

The video controller 27 informs the host computer of the occurrence of jam in a step S605, and effects a corresponding display on the display unit (not shown) of the main body in a step S606.

In a step S607, the supervisory controller 101 searches a transport path enabling paper feeding and ejecting.

If a step S608 identifies presence of such path, a step S609 detects, in this case, that the paper feeding is possible from the cassette 2.

In a step S610, the supervisory controller 101 restores the information of the jammed page by a page management table therein, and displaces the information of other pages in succession. It informs the video controller 27 in a step S611 that the process can be continued, and initiates the paper feeding from the cassette 2 in a step S612.

In a step S613, in response to the information from the supervisory controller 101, the video controller 27 executes a jam recovery process.

If the step S607 identifies absence of the path enabling paper feeding and ejecting, the sequence returns to the steps S605, S606 to request the removal of the jammed sheet to the operator.

This embodiment describes the selection of the paper feed source between the cassette 2 and the paper deck optional unit 40, but it is naturally applicable also in case additional paper deck optional units are connected or in case the number of the cassettes in the main body is increased.

[Seventh Embodiment]

In the following there will be explained, with reference to a flow chart in FIG. 9, the paper transport control of a seventh embodiment of the aforementioned configuration.

It is assumed that a large amount of papers of a same size is contained in the cassette 2 and the paper deck optional unit 40, and that the host computer (not shown) transmits data designating the paper deck optional unit 40 as the paper feed source.

Figure 9:
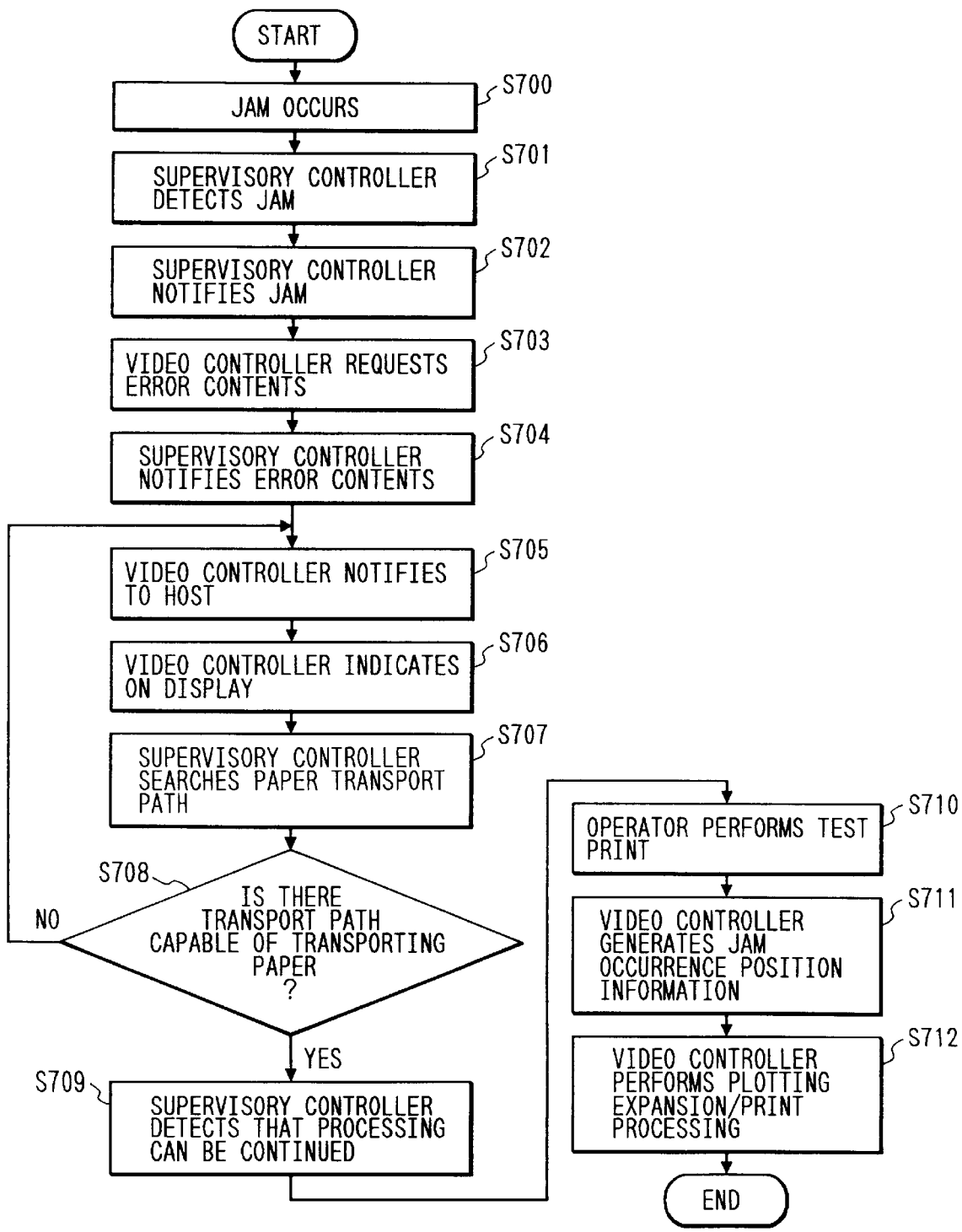
FIG. 9 is a flow chart showing the control sequence of the printing apparatus and the optional units constituting a seventh embodiment 7 of the present invention.

Referring to FIG. 9, it is assumed, in a step S700, that a jam occurs in the feed rollers 42 of the paper deck optional unit 40.

The supervisory controller 101 detects the position of the Jam in a step S701, and informs the video controllers in a step S702 of the occurrence of an error.

In a step S703, the video controller 27 sends, to the supervisory controller 101, a command requesting the content of the error.

In a step S704, the supervisory controller 101 returns, to the video controller 27, a status indicating the occurrence of the jam and the position thereof.

The video controller 27 informs the host computer, in a step S705, of the occurrence of the jam, and effects a corresponding display on the display unit (not shown) of the main body in a step S706.

In a step S707, the supervisory controller 101 searches a transport path enabling paper feeding and ejecting.

If a step S708 identifies the presence of such path, there is detected, in this case, that the paper feeding is possible from the cassette 2.

Then a step S709 informs the video controller 27 that the process can be continued.

If the step S708 identifies the absence of the transport path enabling the paper feeding and ejecting, the sequence returns to the steps S705, S706 to request the removal of the jammed sheet to the operator.

In a step S710, the operator executes a test print by a utility function of the printing apparatus.

In a step S711, the video controller 27 converts the information of the jam position, informed from the supervisory controller 27, into a predetermined character train, inserts the character train into the test print format, and initiates the paper feeding from the cassette 2.

A step S712 effects bit map development and then a print process.

This embodiment describes the selection of the paper feed source between the cassette 2 and the paper deck optional unit 40, but it is naturally applicable also in case additional paper deck optional units are connected or in case the number of the cassettes in the main body is increased.

[Eighth Embodiment]

In the following there will be explained, with reference to a flow chart in FIG. 10, the paper transport control in an eighth embodiment of the aforementioned configuration.

Figure 10:
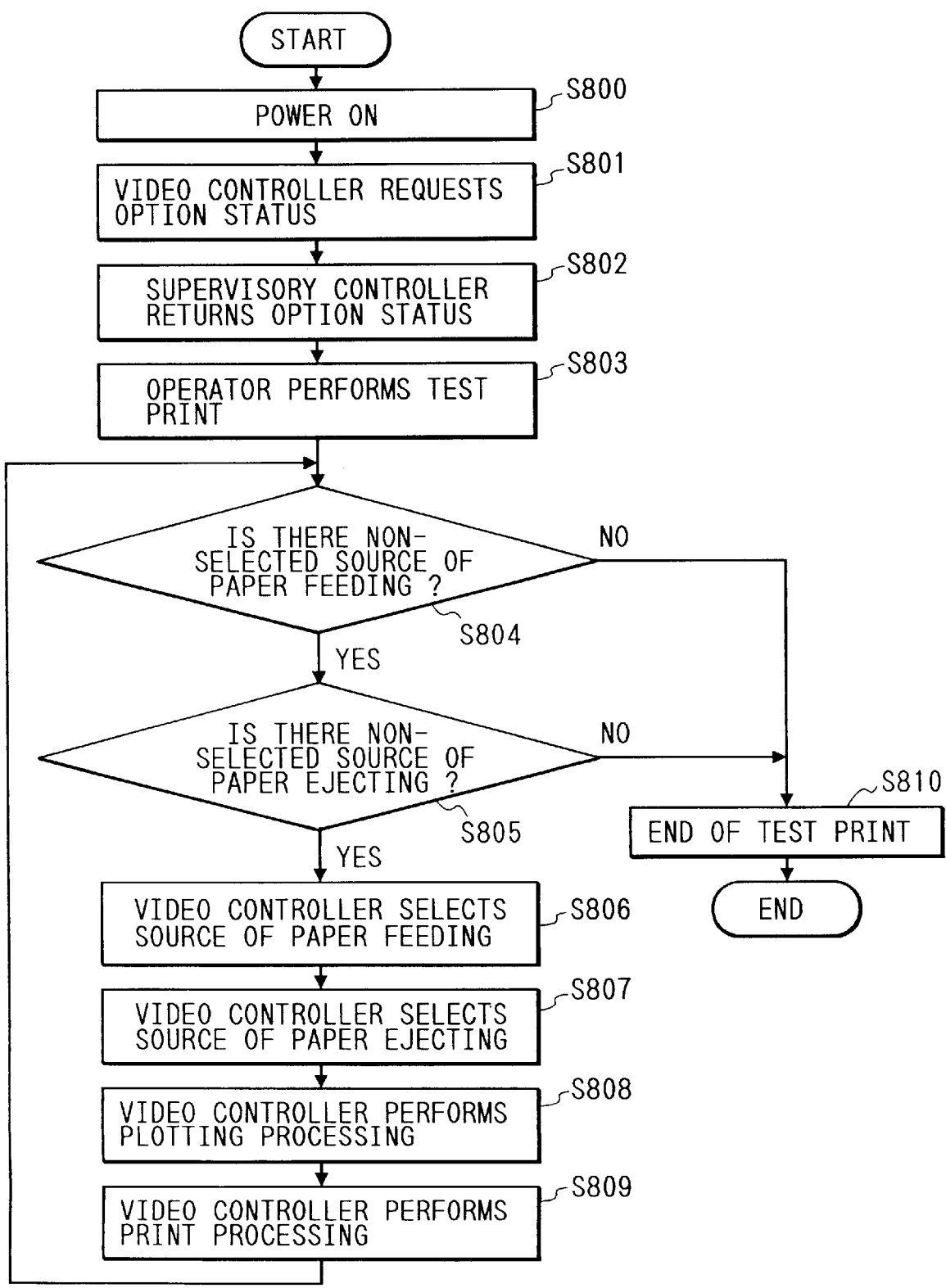
FIG. 10 is a flow chart showing the control sequence of the printing apparatus and the optional units constituting an eighth embodiment of the present invention.

Referring to FIG. 10, at first a step S800 turns on the power supply, and, in a step S801, the video controller 27 sends, to the supervisory controller 101, a command requesting the status of connection of the optional units and of recording sheets.

In a step S802, the supervisory controller 101 returns, to the video controller 27, a status of the optional units.

In a step S803, the operator executes a test print by a utility function of the printing apparatus.

In a step S804, the video controller 27 checks whether a selectable paper feed source exists.

If the step S804 identifies the presence of such paper feed source, the video controller checks, in a step S805, whether a selectable paper ejecting unit exists.

If the step S805 identifies the selectable paper ejecting unit, the video controller 27 releases a paper feed source command in a step S806, and a paper ejecting unit command in a step S807.

Then the video controller 27 executes an image development process (plotting expansion process) in a step S808, and a printing process in a step S809.

If the selectable paper feed source or paper ejecting unit cannot be identified in the step S804 or S805, the test print is terminated in a step S810.

As explained in the foregoing, the present invention enables efficient control of the paper transportation when optional units are connected to the printing apparatus.

[Ninth Embodiment]

Figure 11:
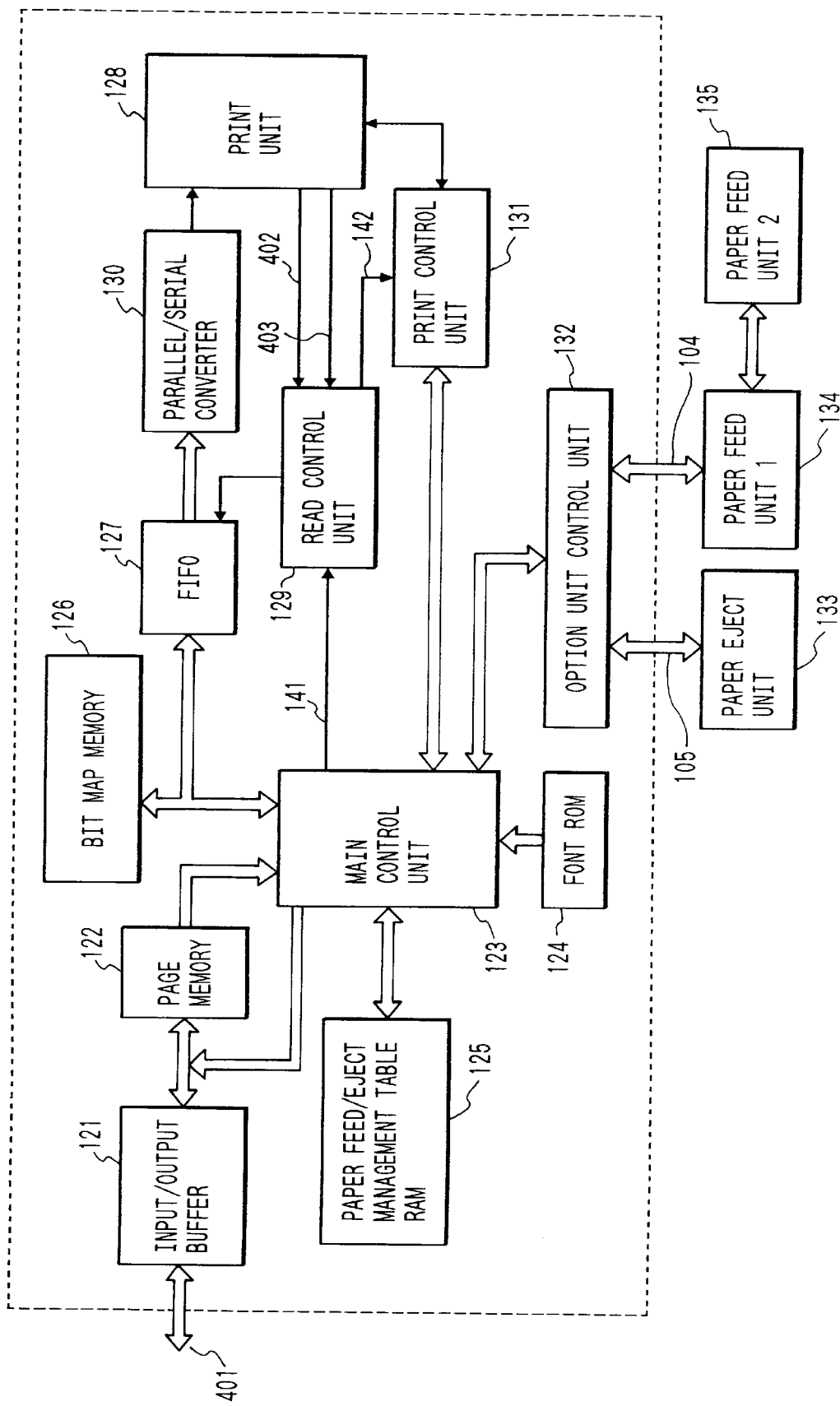
FIG. 11 is a block diagram of a printing apparatus constituting a ninth embodiment of the present invention.

FIG. 11 is a block diagram of a printing apparatus embodying the present invention, wherein shown are text data 401 transmitted from an unrepresented external apparatus such as a host computer; an input/output buffer 121 for receiving the data; a page memory 122 for storing the data in the unit of a page; a main control unit 123; a font ROM 124 storing character font patterns; a RAM 125 storing a paper feed/ejecting management table of the printing apparatus; a bit map memory 126 storing the text data converted into dot data; a FIFO (first-in-first-out memory) 127 functioning as a buffer in the transmission of the dot data to a printing unit 128; a readout control unit 129 for reading the dot data from the FIFO 127 in synchronization with a horizontal synchronization signal 402 and a vertical synchronization signal 403 from the printing unit 218; a parallel-serial converter 130 for converting the read dot data into serial data for supply to the printing unit 128; a print control unit 131 for controlling the printing unit 128; an optional unit controller 132 for controlling paper feeding and ejecting units connected as options to the printing apparatus; an optional paper ejecting unit 133; and optional paper feeding units 134, 135.

Figure 12:
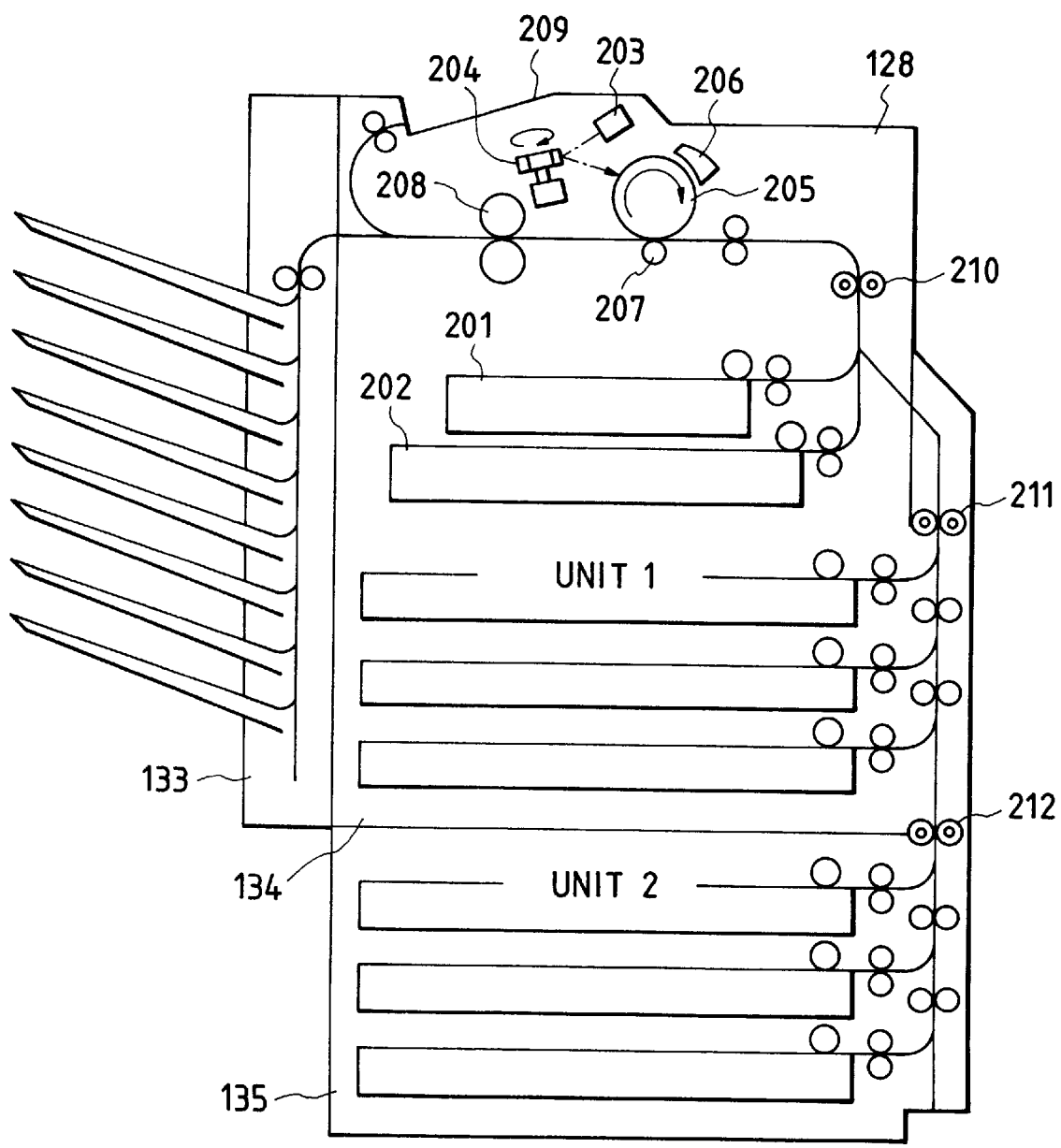
FIG. 12 is a view showing the paper feeding and ejecting systems of the printing apparatus.

FIG. 12 is a view principally showing the paper feeding and ejecting paths in a printing apparatus composed of the printing unit 128 and the paper feeding and ejecting units connected thereto. In FIG. 12 there are shown an upper paper feed unit 201 provided as a standard component in the printing unit 128; a lower paper feed unit 202 provided also as a standard unit; a laser 203 which is turned on and off according to the dot data transmitted from the parallel-serial converter 130; a rotary polygon mirror 204 for scanning a photosensitive drum 205 with the light beam from the laser; a developing unit 206; a transfer roller 207; a fixing unit 208; and a face-down paper ejecting unit 209 (which may be hereinafter referred to as paper ejecting unit, collectively with the optionally connected paper ejecting unit).

Figure 13:
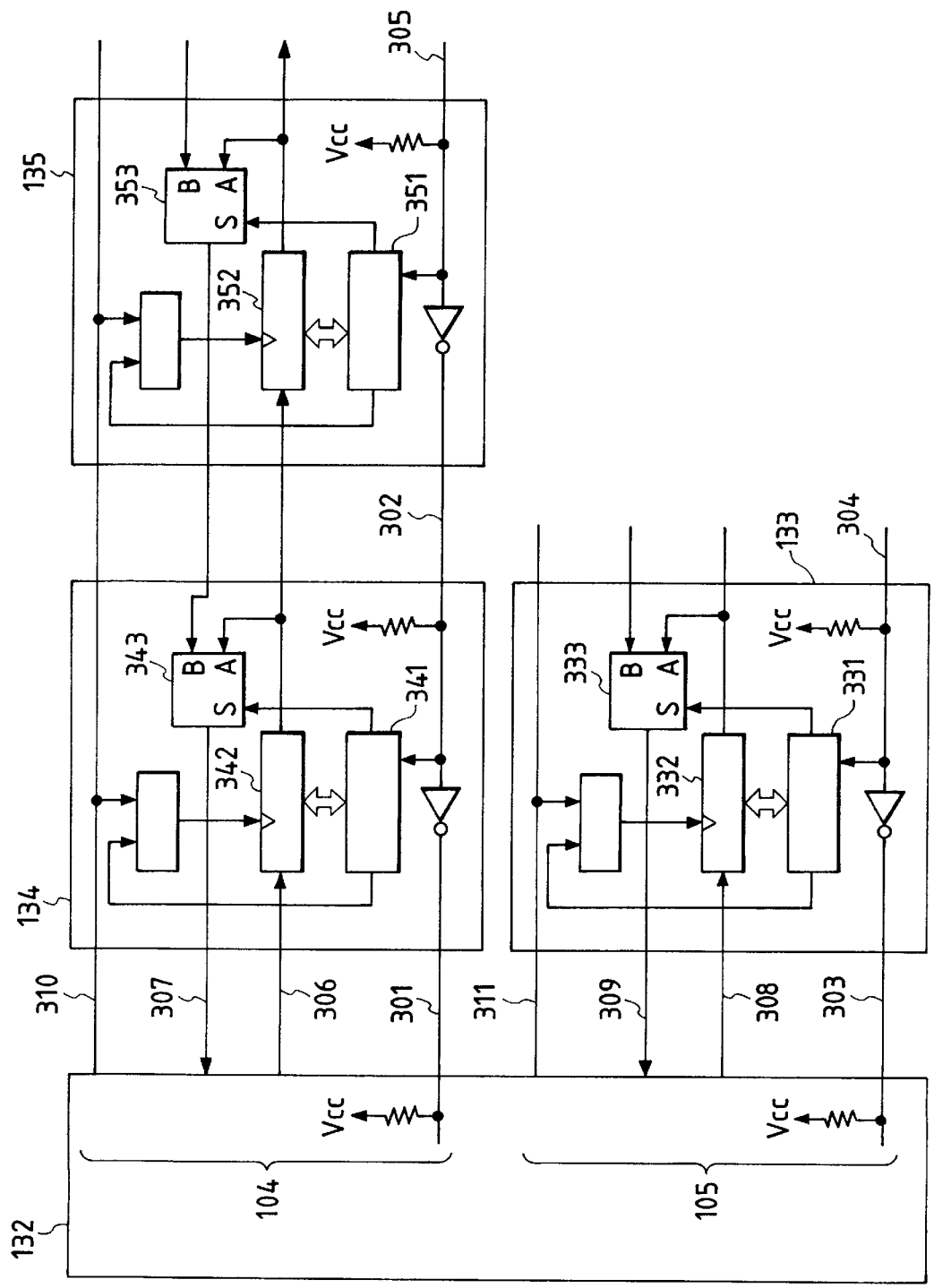
FIG. 13 is a view showing connection of optional units.

In the following there will be explained the functions of the printing apparatus of the ninth embodiment. FIG. 13 shows electrical connections of an optional unit controller 132, a paper ejecting unit 133, a paper feed unit 1 (134) and a paper feed unit 2 (135). As shown in FIG. 13, the paper feed units are connected to a signal line 104 of the optional unit controller 132, while the paper ejecting units is connected to a signal line 105. The two paper feed units are connected serially. More specifically, the unit 2 is connected through the unit 1 to the optional unit controller 132. If another unit 3 is used, it is connected to the unit 2 in a similar manner as the unit 2 is connected to the unit 1. Also if another paper ejecting unit is used, it is connected to the downstream side of the paper ejecting unit 133.

In these optional units, there are provided main controllers 331, 341, 351; 8-bit shift registers 332, 342, 352; selectors 333, 343, 353; serial command lines 306, 308 for sending command signals from the optional unit controller 132 to the optional units; serial status lines 307, 309 for sending status signals from the optional units to the optional unit controller; signal lines 301, 302, 303, 304, 305 for checking the presence of the optional units; and clock signal lines 310, 311 for the command and status lines to the optional units.

Figure 15:
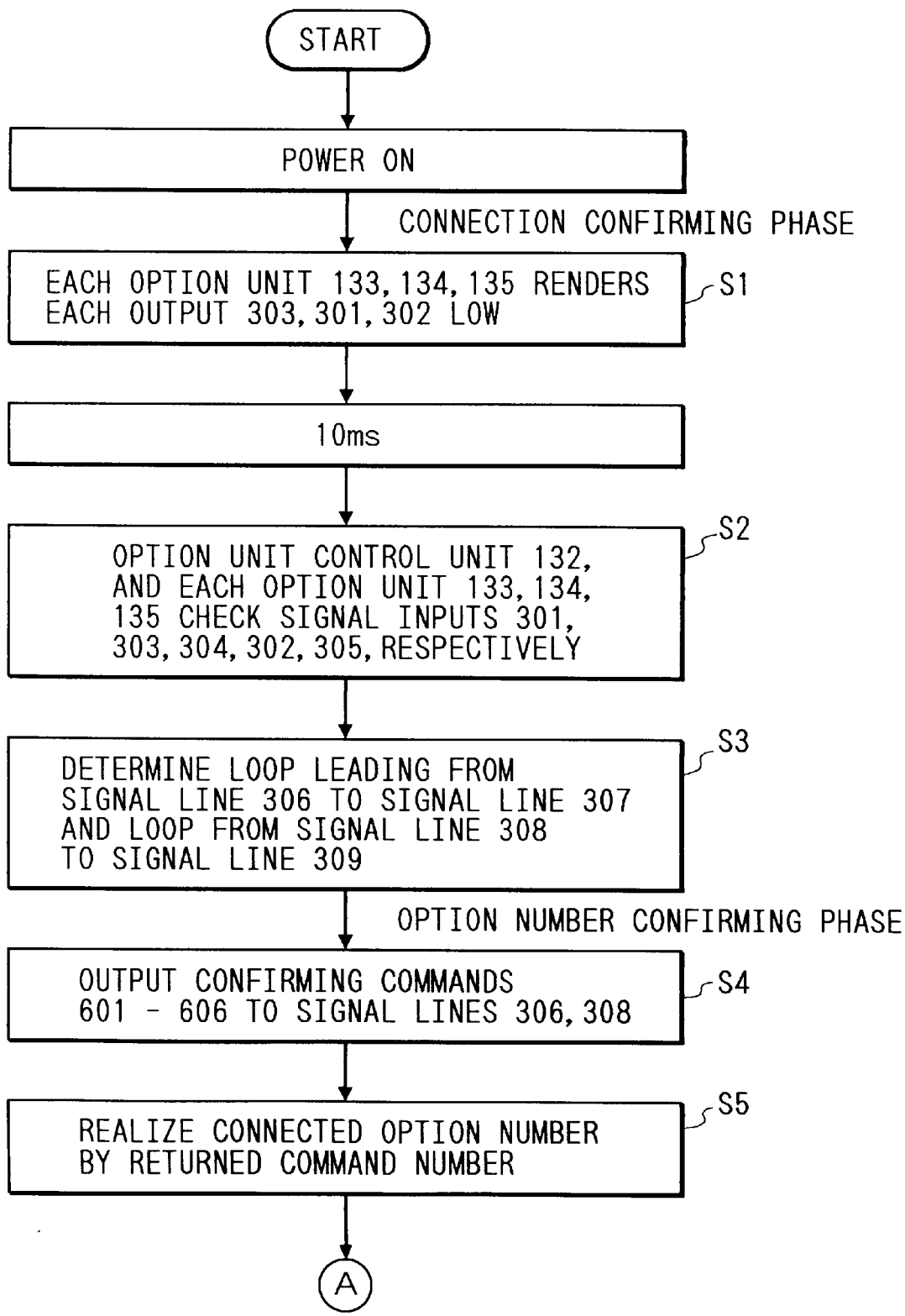
FIG. 15 is a flow chart showing the function of an optional unit controller.

Immediately after the start of power supply, the optional units respectively enter a connection confirming phase, by shifting the respective output signal lines 301, 302, 303 to a low level state (step S1 in FIG. 15). After the lapse of 10 ms, the optional unit controller 132 and the optional units respectively check the level of the signal lines 301, 303, 304, 302 and 305 (step S2 in FIG. 15). As these signal lines 301, 303, 304, 302, 305 are pulled up to Vcc, they are maintained at a high level state unless a unit is connected thereto and the output thereof is shifted to the low level state.

As the signal lines 301, 303 are at the low level state, the optional unit controller 132 detects that at least a paper feed unit and at least a paper ejecting unit are connected. Also as the signal line 302 is at the low level state, the main control unit 341 of the optional unit 134 detects that at least a paper feed unit is connected at the downstream side and opens the selector 343 for an input B. Also as the signal lines 304, 305 are at the high level state, the main control units 331, 351 of the optional units 133, 135 detect that no optional units are connected at the downstream side and respectively open the selectors 333, 353 for an input A.

Figure 14:
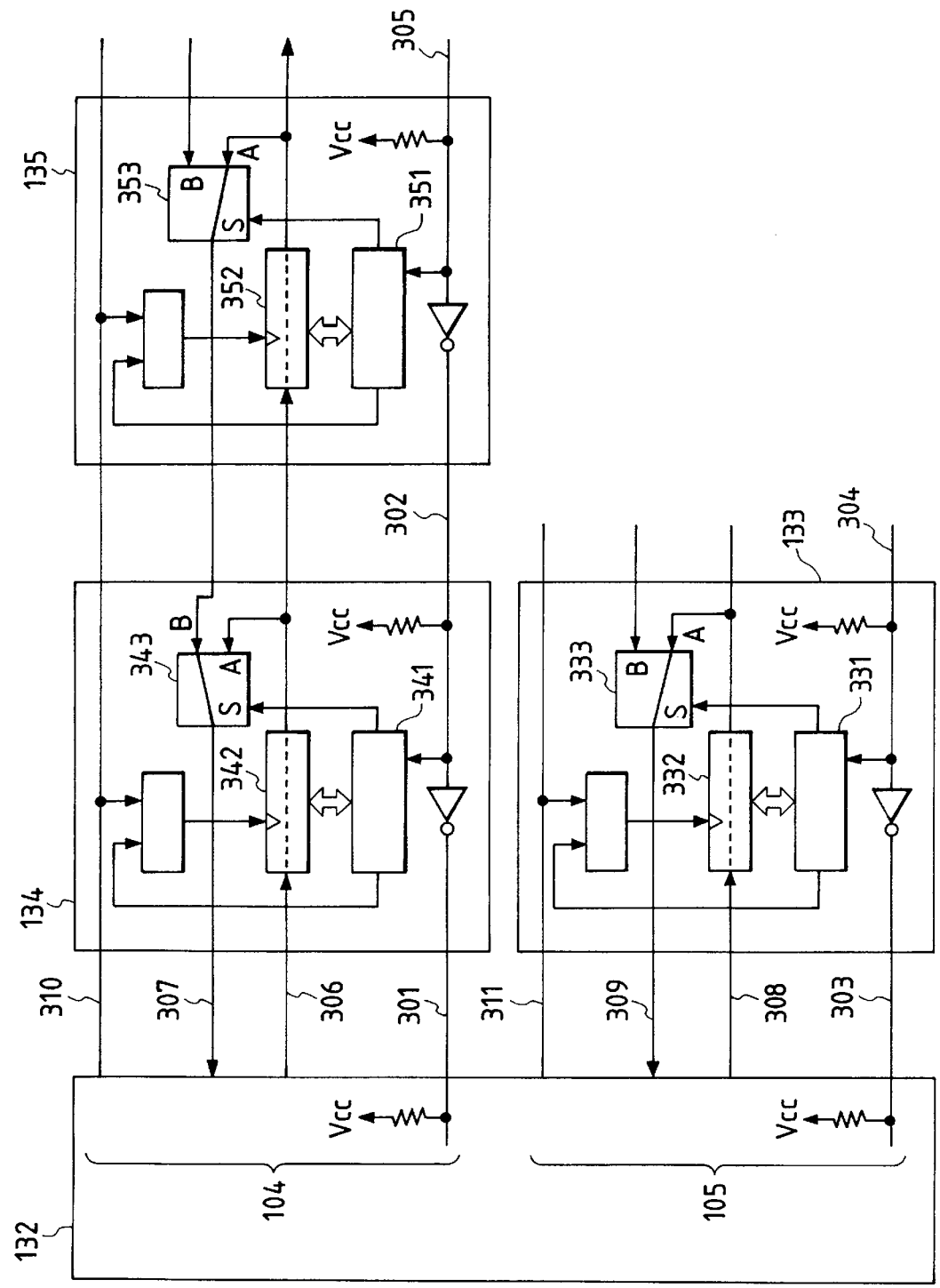
FIG. 14 is a view showing connection of optional units, with established signal routes.

As a result, as shown by thick lines in FIG. 14, there are established a command/status loop from the signal line 306 to 307, and another loop from the signal line 308 to 309 (step S3 in FIG. 15).

Figure 16:
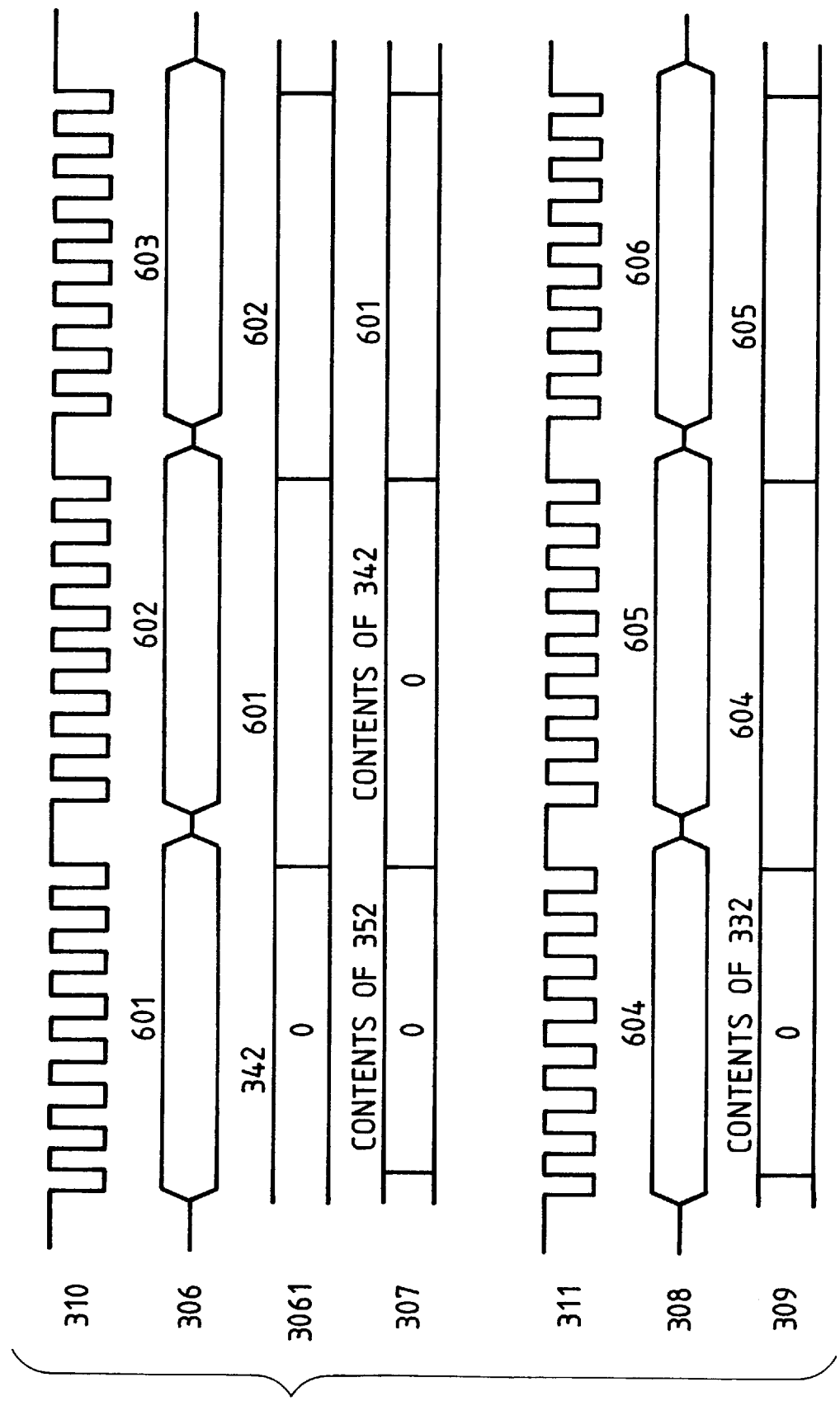
FIG. 16 is a timing chart for the paper feed system, showing signal exchange between the optional unit controller and optional units.

Then the optional unit controller enters a phase for confirming the number of the connected optional units. At first the optional unit controller sends, as shown in FIG. 16, confirmation commands 601–606 to the signal lines 306, 308 (step S4 in FIG. 15). The commands 601–606 are mutually same and are composed of a bit train such as 10101010. The optional units do not effect any action to these confirmation commands.

On the signal line 306 there appears, in synchronization with the clock signal 310 as shown in FIG. 16, the content of the register 352 (set in advance at 0 by the main control unit 351), the content of the register 342 (also set in advance at 0 by the main control unit 341) and the content of the command 601. The optional unit controller detects the entry of the command 601 alone and knows that two optional paper feed units are connected (step S5 in FIG. 15). Similarly, it detects the returning of the commands 604, 605 on the signal line 309 and thus knows the connection of an optional paper ejecting unit (step S5 in FIG. 15). In this embodiment, three optional units can be connected at maximum, for each of the paper feeding and paper ejecting.

Figure 18:
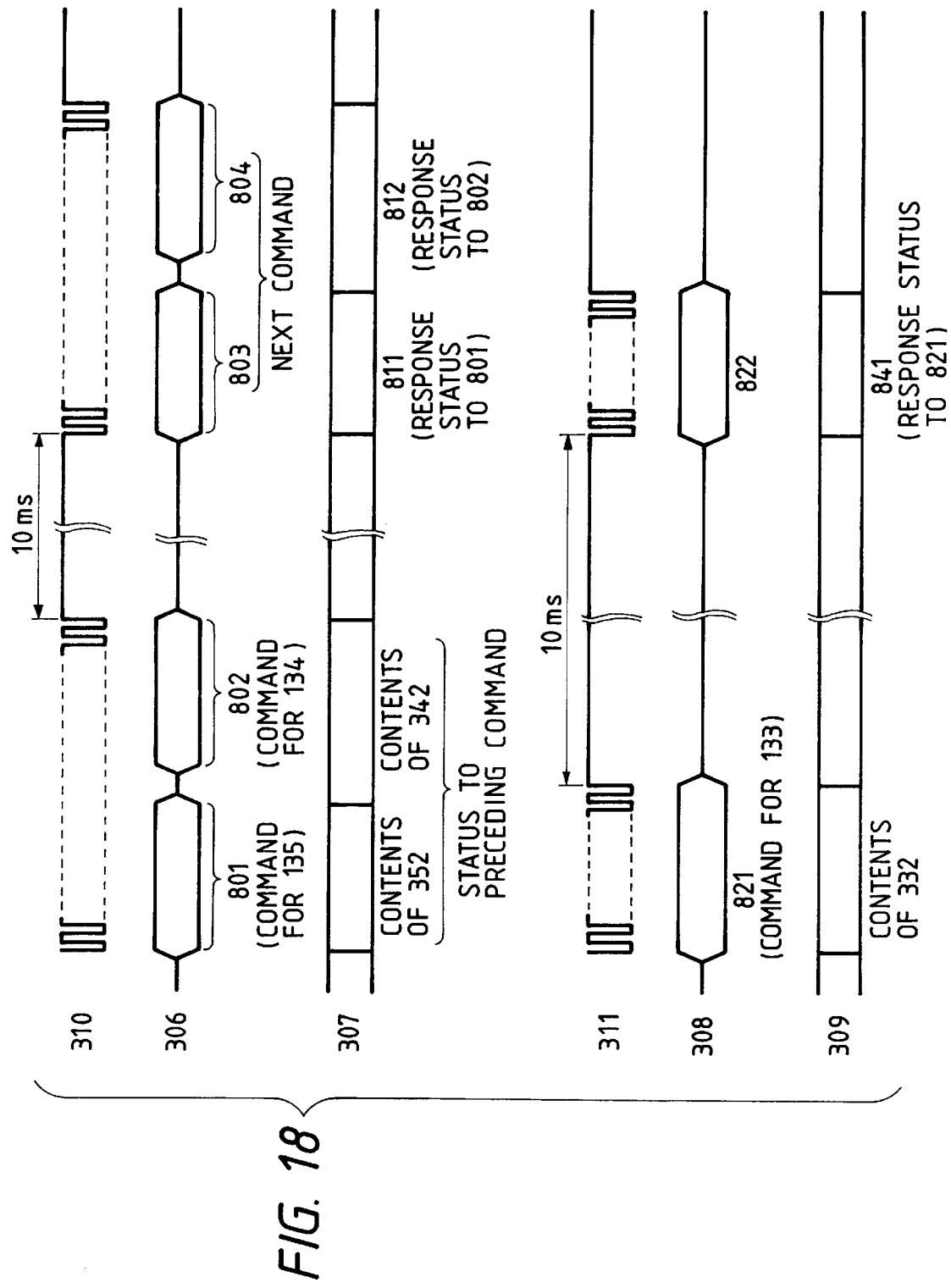
FIG. 18 is a timing chart for the paper ejecting system, showing signal exchange between the optional unit controller and optional units.
Figure 27:
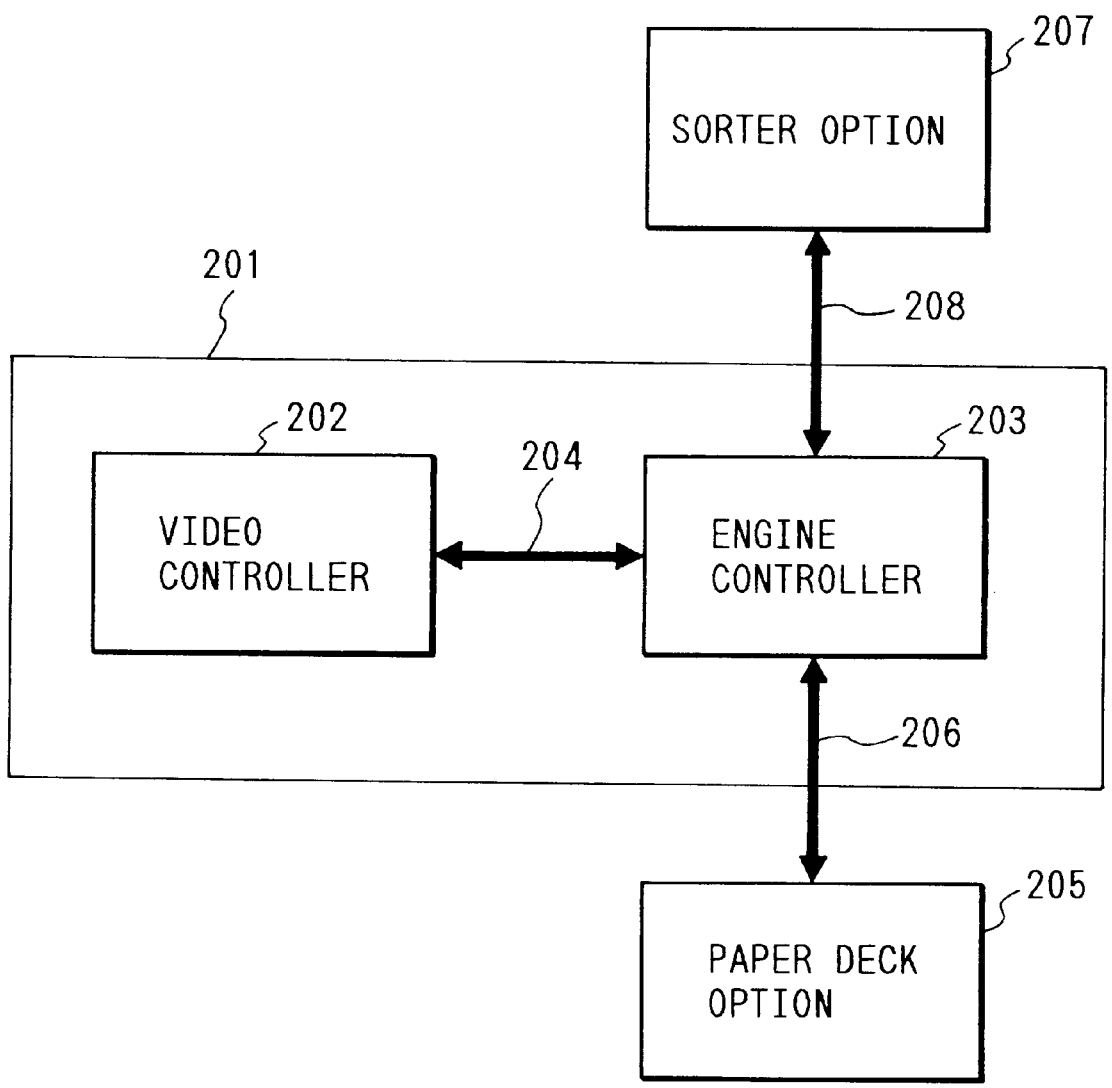
FIG. 27 is a view showing a conventional configuration.

Then the optional unit controller confirms the kind of the connected optional units, utilizing the above-explained system of sending commands on the signal lines 306, 308 and receiving the contents of the registers 342, 352, 332 appearing on the signal lines 307, 309, as will be explained more detailedly in the following with reference to FIG. 18.

The optional unit controller 132 sends a command, every 10 ms, to each optional unit. The commands are transmitted to the optional units through the signal lines 306, 308. For example, the commands 801, 802 are respectively transmitted to the registers 352, 342 of the optional units 135, 134 and supplied to the control units 351, 341.

Prior to the transmission of the next command after 10 ms, the optional units load statuses responding to the command in the registers 342, 352, 332. The contents of these registers, or the responding statuses, are returned to the optional unit controller 132 through the signal lines 307, 309 in synchronization with the clock signals 310, 311 for the next command transmitted after 10 ms. In this manner, the responding status to the command from the optional unit controller 132 is returned after 10 ms.

Figure 17:
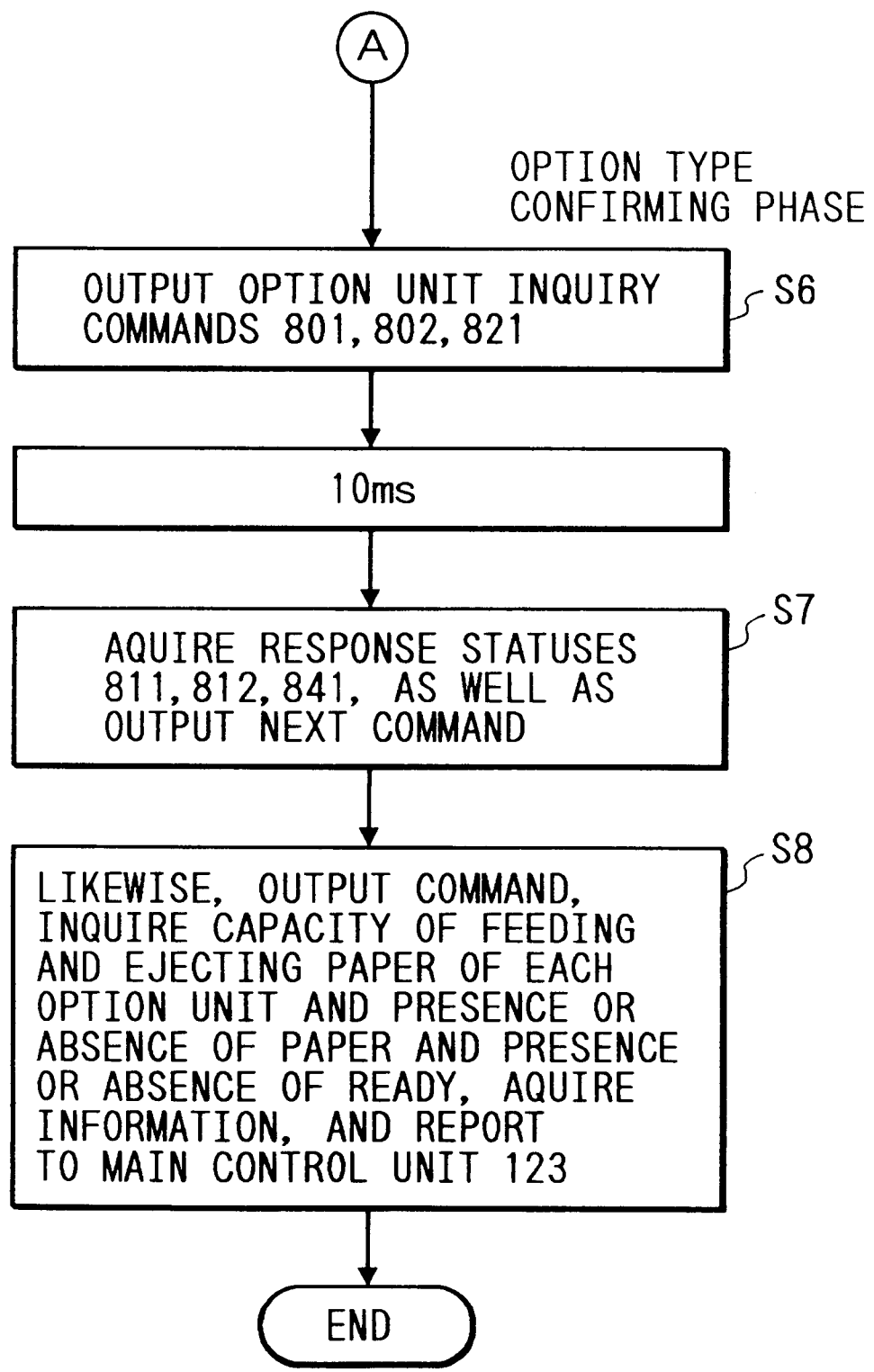
FIG. 17 is a flow chart showing the function of an optional unit controller.

More specifically, the optional unit controller 132 releases commands 801, 802, 821 asking the kind of the optional units (step S6 in FIG. 17). After the lapser of 10 ms, next commands (which can be commands instructing no action) are released and the response status signals 811, 812, 841 are obtained. The response status is a code determined in advance for each optional unit and can be, for example, "10000001" for an optional 3-tray paper feed unit.

Also the detailed information of the optional units (for example the number of paper feed trays, the paper capacity, the paper size, the presence or absence of papers and whether the paper feeding can be started, for each tray in case of the paper feed unit; and the number of paper eject trays, the paper capacity, the presence or absence of papers and whether the paper ejecting can be started, for the paper ejecting unit) is asked by similar command transmission, and the obtained status information is informed to the main control unit 123 (FIG. 11) (step S8 in FIG. 17). The main control unit 123 loads the optional unit information, obtained from the optional unit controller 132, in a paper feed/ejecting management table RAM 125. It also obtains similar information on the upper paper feed unit 201, the lower paper feed unit 202 and the face-down paper ejecting unit 209 provided in the printing unit 128, by asking to the print control unit 131 and loads the obtained information in the paper feed/ejecting management table RAM 125.

As a result, the paper feed/ejecting management table 125 stores the information shown in FIGS. 19 and 20. In FIG. 19, a column 901 indicates the kinds of the paper feed units, while a column 902 indicates the respective paper sizes, a column 903 indicates presence or absence of paper in the respective units, and a column 904 indicates whether each unit is ready for paper feeding. In fact each information is represented by a bit train such as 1010. In this embodiment, the units are arranged in the increasing order of the paper feed path length (or the time required for paper feeding) to the photosensitive drum 205. In the column 901, the last row "NONE" indicates absence of other paper feed units.

Also in FIG. 20, a column 1001 indicates the kinds of the paper ejecting units, a column 1002 indicates the respective paper capacities, a column 1003 indicates presence or absence of ejecting papers, and a column 1004 indicates whether paper ejecting is possible for each unit. The paper feed/ejecting management table RAM 125 is renewed from time to time by the main control unit 123, according to the status of the paper feed/ejecting command. Also same information is reported to the unrepresented host computer through the data line 101.

Now there will be explained the function of this embodiment, in the actual printing operation. The data transmitted from the host computer through the data line 101 are composed of character codes and control codes. The character code indicates a character to be printed, while the control code is used for designating the position, size and font of the character and also designating the size of printing sheet and the number of copies.

The character codes and the control codes are stored, in the unit of a page, in the page memory 122. The main control unit 123 reads these codes in succession, effects inquiry to the font ROM 124 based on the character codes and the control codes, also effects processing such as enlargement if necessary, and develops a dot pattern in the bit map memory 126. After the dot pattern development of a page, the printing operation is initiated. In the following there will be explained, as an example, a case of preparing 8 copies an A4-sized sheets. These conditions may be designated by the control codes, or from an unrepresented operation panel on the printing apparatus.

At first the main control unit 123 selects the paper feed unit and the paper ejecting unit, by referring to the paper feed/ejecting management table RAM 125. In the state shown in FIGS. 19 and 20, all the paper feed/ejecting units are ready. As the sheet size is A4, there is selected the standard upper paper feed unit of shortest paper feed time, in order to shorten the time required for printing.

Also for preparing 8 copies, there is selected the optional paper ejecting unit 133. In case of preparing only 1 copy, there will be selected the standard face-down paper ejecting unit of the shortest paper ejecting time. The main control unit 123 informs the print control unit 131 of the selection of the standard upper paper feed unit, and also informs the optional unit controller 132 of the selection of the paper ejecting unit 133 and that all 8 ejecting bins are to be used.

Then the main control unit 123 sends a readout start command signal 141 to the readout control unit 129, and starts reading of the dot pattern stored in the bit map memory 126 and storage in the FIFO 127. In response to the signal 141, the readout control unit 129 sends a print start command signal 142 to the print control unit 131, which in response starts rotation of the polygon mirror 204, rotation of the photosensitive drum 205 and operation of the paper transport system, whereby the printing unit 128 releases the horizontal synchronization signal 102 resulting from the rotation of the polygon mirror 204 and the vertical synchronization signal 103 resulting from the rotation of the photosensitive drum.

In synchronization with the signals 102, 103 (used for horizontally and vertically synchronizing the transmission of the image dot data from the readout control unit 129 to the print unit 128), the readout control unit 129 reads the dot pattern from the FIFO 127, and the read dot pattern is converted by the parallel-serial converter 130 into a serial signal according to which the printing unit 128 turns on and off the laser 203 to scan the photosensitive drum, whereby the image data are recorded thereon.

In the meantime, the print control unit 131 feeds the printing paper from the upper paper feed unit 201 to a position immediately in front of the paper feed registration rollers 210, and rotates the registration rollers 210 in such a timing that the front end of the paper coincides with the front end of the image pattern on the photosensitive drum 205, thereby advancing the printing paper to the position of the photosensitive drum 205. In this state, from the start of the paper feeding to the completion of passing of the paper through the registration rollers 210, the paper feed management table shown in FIG. 19 is altered, as shown in FIG. 21A, to disable the paper feeding from the standard upper and lower paper feed units, but the paper feeding from these units are again enabled, as shown in FIG. 21B, after the passing through the registration rollers 210.

The optional paper feed command remains in the enabled state, since the paper can be moved to a position in front of the optional paper feed registration rollers 211. However, if a paper is fed in this state from the optional paper feed unit, the command is altered to the disabled state (disabling next paper feed).

As explained in the foregoing, the state of the paper feed units is from time to time reported from the print control unit 131 to the main control unit 123 and is reflected on the management table RAM 125.

The paper supplied to the photosensitive drum 205 is subjected to printing, and then to image fixation by the fixing unit 208. In the meantime, the main control unit 123 sends a paper ejecting start command to the optional unit controller 132, which in response causes the paper ejecting unit 133 to initiate the paper ejecting operation to the sorter A. In this state, until the printed paper enters the paper ejecting unit 133, the paper ejecting management table shown in FIG. 20 is altered to disable the paper ejecting in the standard face-down paper ejecting unit as shown in FIG. 22A, and is altered again as shown in FIG. 22B when the paper enters the paper ejecting unit 133. The paper is ejecting to the sorter bin A of the paper ejecting unit 133, and, at the completion of paper ejecting, the paper ejecting is enabled as shown in FIG. 22C. The next printed paper is ejected to the sorter bin B, and then the printing is repeated in succession to the sorter bin H.

In the following there will be explained a case of printing one copy on a B4-sized paper. In this case the optional paper feed unit B of the optional paper feed unit 134 is selected for paper feeding, and the standard face-down paper ejecting unit of the shortest paper ejecting time is selected for paper ejecting. In the following there will only be explained the timing of paper transportation, since other operations are same as explained in the foregoing.

Upon completion of the development of the image dot data in the bit map memory 126, the main control unit 123 informs the optional unit controller 132 of the selection of the paper feed unit B of the optional paper feed unit 134, and also informs the print control unit 131 of the standard face-down paper ejecting.

With the start of the printing operation, the main control unit 123 sends a paper feed command to the optional unit controller 132, whereupon a paper is fed from the paper feed unit B of the optional paper feed unit 134 to the registration rollers 210. From the start of paper feeding, the paper feed/ejecting management table is altered as shown in FIG. 23A. When the paper is advanced to the photosensitive drum 205 by the function of the registration rollers 210, the table is altered as shown in FIG. 23B, indicating that a paper feed unit is available for the next paper feeding. A state shown in FIG. 23C is retained until the printing is conducted and the paper ejecting is completed.

As explained in the foregoing, the paper feeding and ejecting, including the standard units and the optional units, can be collectively controlled by referring to the paper feed/ejecting management table 125.

In the following there will be explained embodiments 10 to 15, which correspond to partial improvements of or partial functional additions to the ninth embodiment. Consequently, parts same as those in the ninth embodiment will be omitted from the following description.

[Tenth Embodiment]

FIG. 24A shows a state in which the optional paper feed unit 2 is incapable of paper feeding, for example because of paper jamming therein. In this case the paper feeding is possible from the optional paper feed unit 1, so that the main control unit 123 effects the printing operation by switching the paper feeding to the optional paper feed unit 1.

Also, in case the paper ejecting is not possible because of paper jamming in the paper ejecting unit 133 as shown in FIG. 24B, the main control unit 123 effects the printing operation by selecting the standard face-down paper ejecting unit 209.

[Eleventh Embodiment]

The ninth embodiment selects a combination of the paper and ejecting units realizing short paper feeding and ejecting time, but it is also possible to select the optionally connected paper feed and ejecting units.

[Twelfth Embodiment]

For example, in case the papers run out in the standard paper feed unit in the course of a printing operation with the paper feeding from the standard paper feed unit, and if the automatic paper feeding is instructed, there is automatically selected a unit with favorable throughput. In the twelfth embodiment, there is next selected the paper feed unit A of the optional paper feed unit 134, which realizes a shorter time for paper feeding.

[Thirteenth Embodiment]

When an optional paper feed or ejecting unit is added, there is naturally made an addition to the content of the management table RAM 125. However, there may be added a mode of preferentially selecting the added paper feed or ejecting unit as a default, if the instruction for paper feeding or ejecting is not given from the printing apparatus or from the unrepresented operation panel.

[Fourteenth Embodiment]

In case the papers run out in the standard paper feed unit in the course of a printing operation with the paper feeding from the standard paper feed unit, and if the automatic paper feeding is not instructed, the printing operation is interrupted until the papers are replenished in the standard paper feed unit.

Also in the automatic paper feed mode, it may become necessary to repeat the printing even before shifting to the automatic paper feed mode because of the paper jamming. In such case the printing operation may be repeated by selecting the paper feed unit selected in the previous printing operation.

This can be achieved by registering the information of the paper feed unit, for each paper, in the paper feed/ejecting management table RAM 125 shown in FIG. 11. An example of such registration is shown in FIG. 25, illustrating a table which manages the information of 10 sheets, wherein a column 1501 indicates the paper numbers, representing the order of the sheets to be printed; a column 1502 indicates the size information of the sheets to be printed; a column 1503 indicates the units to be used for paper feeding; a column 1504 indicates information whether the paper feeding unit is designated; 1505 indicates the paper ejecting units; 1506 indicates information whether the paper ejecting unit is designated; and 1507 indicates information whether the paper is printed and ejected. In the column 1507, a mark COMPLETE indicates that these operations have been completed, while a mark INCOMPLETE indicates that the paper is not yet printed or has been printed but not ejected.

Consequently, the information, marked as INCOMPLETE in the column 1507, has to be recovered in case of paper jamming. Also, the information marked as COMPLETE in the column 1507, having completed all the operations, can be rewritten. Consequently, in FIG. 25, as the sheets 1, 2, 3 are complete, these rows are cyclically used for storing the information of the sheets 11, 12, 13. If the jamming is detected at the eighth row (1508), the recovery printing after the jamming is resolved is conducted for the fourth to eighth sheets, and, for each sheet for which the paper feeding and/or paper ejecting is designated, the printing operation is executed according to such designation.

If the paper feeding is not possible from the designated paper feeding unit, the process waits until the designated paper feeding unit becomes available, and, if the paper ejecting is not possible to the designated paper ejecting unit, the process waits until the designated paper eject unit becomes available.

[Fifteenth Embodiment]

FIG. 26 shows a state in which the optional paper feed unit 135 is not available for paper feeding because of a trouble and the optional paper sorter is also not available. Even in such case, as long as the data do not designate such unavailable paper feed/ejecting means, it is possible to use a printing route of feeding the paper from the paper feed unit 1 and ejecting the same to the standard face-down paper ejecting unit, and the main control unit 123 effects the printing operation by selecting such route.

As explained in the foregoing, the present invention enables to manage the text data transmitted from the host computer and the optimum paper feed and ejecting route therefor.

More specifically:

(1) Even if all the paper feeding and ejecting units are not ready, the printing operation is enabled if there is a combination of the units enabling paper feeding and ejecting;

(2) There can be obtained a combination of the paper feeding and ejecting units, enabling the printing operation with the shortest time;

(3) There can be obtained the combination of the paper feeding and ejecting means, allowing to maintain continuous printing operation, maximizing the printing throughput; and (4) In the jam recovery operation, it is rendered possible to reproduce the paper feeding and ejecting route, necessary for the recovery printing, so that there can be provided a more flexible printing apparatus.

Also the foregoing embodiments may be utilized in various combinations.

What is claimed is:

1. A printing apparatus provided with a main body including a video controller, having video signal generation means for generating a video signal from image information based on a recording command from an external apparatus and control means, and with a supervisory controller including optional unit control means for controlling at least an optional unit connectable to said main body, wherein said video controller comprises process time informing means for informing the supervisory controller of an image development process time, and said supervisory controller comprises:

paper transport time memory means for storing paper transport time from an optional paper feed source to an entrance of the printing apparatus;

comparator means for comparing process time informed by said process time informing means with the paper transport time stored in said paper transport time memory means; and paper feed source changing means for changing the paper feed source in case said comparator means identifies that said process time is shorter.

2. A printing apparatus according to claim 1, wherein, when said paper feed source changing means changes the paper feed source, said video controller is adapted to detect change of the paper feed source by said paper feed source changing means and to inform the external apparatus of the change of the paper feed source.

3. A printing apparatus provided with a main body including a video controller, having video signal generation means for generating a video signal from image information based on a recording command from an external apparatus and control means, and with a supervisory controller including optional unit control means for controlling at least an optional unit connectable to said body, wherein said video controller comprises process order changing means for changing an execution order in which print processes specified by plural data, received in a reception order from the external apparatus, are executed, in such a manner that the paper feeding can continue without interruption, and informing means for informing the external apparatus of the change of the execution order by said process order changing means.

4. A printing apparatus according to claim 3, wherein said process order changing means is adapted to determine whether or not to change the execution order, according to which one of a plurality of paper feed means the papers for the print processes specified by the plural data are supplied from and according to a paper transport time from each paper feed means to a printing unit.

5. A printing apparatus provided with a main body including a video controller, having video signal generation means for generating a video signal from image information based on a recording command from an external apparatus and control means, and with a supervisory controller including optional unit control means for controlling at least an optional unit connectable to said main body, wherein said video controller comprises designation means for designating the information, on paper and paper feeding for the data received from the external apparatus, in the supervisory controller;

said supervisory controller comprises paper feed information determining means for determining the paper feed information from the information designated by said designation means and a status of the optional unit; and said video controller further comprises paper feed information detecting means for detecting the paper feed information determined by said paper feed information determining means of the supervisory controller, and paper feed information informing means for informing the external apparatus of the paper feed information detected by said paper feed information detecting means.

6. A printing apparatus according to claim 5, wherein said paper feed information detected by said paper feed information detecting means is displayed on a display in the main body of the printing apparatus.

7. A printing apparatus provided with a main body including a video controller, having video signal generation means for generating a video signal from image information based on a recording command from an external apparatus and control means, and with a supervisory controller including optional unit control means for controlling at least an optional unit connectable to said main body, comprising:

test print means for indicating the information on the position of jamming on a test print, when said path judgment means identifies the path enabling the printing process, and when the operator executes a test printing by a utility function of the printing apparatus, wherein said supervisory controller comprises path judgment means for judging, in case of a paper jamming, whether there exists a path allowing a printing process without passing a position of jamming, and continuation informing means adapted, when said path judgment means identifies a presence of a path allowing the printing process, to inform the video controller that the printing process can be continued, and said video controller is adapted, upon receiving said information from said continuation informing means, to continue the printing process, utilizing said path enabling the printing process.

8. A printing apparatus according to claim 7, wherein said video controller is adapted to inform the external apparatus of the continuation of the printing process, and to cause a display in the main body of the printing apparatus to display such continuation.

9. A printing apparatus provided with a main body including a video controller, having video signal generation means for generating a video signal from image information based on a recording command from an external apparatus and control means, and with a supervisory controller including optional unit control means for controlling at least an optional unit connectable to said main body, wherein said supervisory controller comprises path judgment means for judging, in case of a paper jamming, whether there exists a path allowing a printing process without passing a position of jamming, and continuation informing means adapted, when said path judgment means identifies presence of a path allowing the printing process, to inform the video controller that the printing process can be continued, and said video controller is adapted, upon receiving said information from said continuation informing means, to continue the printing process, utilizing said path enabling the printing process, wherein said supervisory controller further comprises table changing means for rearranging a page management table for the papers already fed in the optional unit when said path judgment means identifies the path enabling the printing process, and the printing process is continued from the page changed by said table changing means.

10. A printing apparatus according to claim 9, wherein said video controller is adapted to inform the external apparatus of the continuation of the printing process, and to cause a display in the main body of the printing apparatus to display such continuation.

11. A printing apparatus provided with a main body including a video controller, having video signal generation means for generating a video signal from image information based on a recording command from an external apparatus and control means, and with a supervisory controller including optional unit control means for controlling at least an optional paper ejecting means connectable to said main body, further comprising, paper feed means for effecting paper feeding from all the connected optional paper feed units, and paper ejecting means for effecting paper eject to all the connected optional paper ejecting means, when the operator executes a test print by a utility function of the printing apparatus.

12. An apparatus comprising:

means for obtaining time information relating to a time necessary for converting data sent from an external apparatus into image data; and means for selecting one of a plurality of feeding units in accordance with the obtained time information, wherein said selecting means selects a feeding unit to feed a recording medium, onto which the converted image data are formed.

13. An apparatus comprising:

means for receiving data from an external apparatus, said receiving means being capable of receiving, in a reception order, first data specifying an image to be formed on a recording medium fed from a first feeding unit, and second data specifying an image to be formed on a recording medium fed from a second feeding unit;

means for storing the received data;

means for determining a generation order in which images for the first and second data are generated;

means for controlling image generation in accordance with the generation order determined by said determining means, wherein if the determined generation order is opposite to the reception order, said controlling means controls image generation such that the images for the first and second data are generated in the generation order opposite to the reception order; and means for sending to the external apparatus information on the generation order controlled by said controlling means.

14. A printing apparatus provided with a paper feed unit and a paper ejecting unit as standard components and a paper feed unit and a paper ejecting unit which can be added as optional units, said apparatus comprising:

means for receiving text data from an external apparatus; and means for selecting a combination of the usable paper feed unit and the usable paper ejecting unit, among the above-mentioned paper feed and ejecting units, wherein said combination is selected, based on the information on a number of copies of printing and a paper size transmitted from the external apparatus or an operation panel of the printing apparatus, and according to a designation of the paper feed unit and the paper ejecting unit when such designation is made from the external apparatus or by the printing apparatus when such designation is absent.

15. A printing apparatus according to claim 14, wherein said combination is a combination of a paper feed unit and a paper ejecting unit providing the shortest time required for paper feeding and ejecting.

16. A printing apparatus according to claim 14, wherein said combination is such a combination that the printing apparatus can maintain a highest throughput.

17. A printing apparatus according to claim 14, wherein when said text data from the external apparatus include plural papers of a same size, paper feeding is made from a same paper feed unit for maintaining the highest throughput.

18. A printing apparatus according to claim 17, wherein, when the papers run out in the currently selected paper feed unit and still papers are required for continuing the printing process, there is selected a paper feed unit that provides the highest throughput.

19. A printing apparatus according to claim 14, wherein when an additional paper feed unit and/or an additional paper ejecting unit is added, such additional paper feed and/or ejecting unit is preferentially used unless another designation exists.

20. A printing apparatus according to claim 14, wherein, when all the paper feed units and the paper ejecting units are not usable, the printing process is executed when the unusable units can be replaced by other units and when there can be secured a paper feed and ejecting path required for the printing process.

21. A printing apparatus according to claim 14, wherein, in case of effecting a recovery printing starting from the occurrence of jamming, the recovery printing is executed according to the original designation of the paper feed means or the paper ejecting means, even when the automatic paper feed/ejecting mode is selected at the occurrence of jamming.

22. A printing apparatus according to claim 21, wherein said recovery printing process waits, when the paper feeding is not possible from the designated paper feed unit, until said paper feed unit becomes available, or, when the paper ejecting is not possible to the designated paper ejecting unit, until said paper ejecting unit becomes available.

23. A printing apparatus for printing text data received from an external apparatus, comprising:

paper feed units and paper ejecting units provided as standard components;

paper feed units and paper ejecting units provided as optional units;

detection means for detecting at least a number and a status of said optional paper feed and eject units;

memory means for storing status information of said optional paper feed and ejecting units detected by said detection means and status information of said standard paper feed and ejecting units; and selection means for selecting a combination of desired paper feed and eject units according to a print command, referring to the status information stored in said memory means.

24. A printing apparatus according to claim 23, wherein, among the status information stored in said memory means, availability of the paper feed and ejecting units, presence or absence of papers to be fed from the paper feed units and the presence or absence of papers in the paper ejecting units are renewed according to the progress of the printing process, and presence or absence of jamming detectable.

25. A printing apparatus provided with a paper feed unit and a paper ejecting unit as standard components and a paper feed unit and a paper ejecting unit which can be added as optional units, said apparatus comprising:

means for receiving text data from an external apparatus; and means for selecting a combination of the usable paper feed unit and the usable paper ejecting unit, among the above-mentioned paper feed and ejecting units, wherein said combination is a combination of a paper feed unit and a paper ejecting unit providing the shortest time required for paper feeding and ejecting.

26. A printing apparatus provided with a paper feed unit and a paper ejecting unit as standard components and a paper feed unit and a paper ejecting unit which can be added as optional units, said apparatus comprising:

means for receiving text data from an external apparatus; and means for selecting a combination of the usable paper feed unit and the usable paper ejecting unit, among the above-mentioned paper feed and ejecting units, wherein said combination is such that the printing apparatus can maintain a highest throughput.

27. A printing apparatus provided with a paper feed unit and a paper ejecting unit as standard components and a paper feed unit and a paper ejecting unit which can be added as optional units, said apparatus comprising:

means for receiving text data from an external apparatus; and means for selecting a combination of the usable paper feed unit and the usable paper ejecting unit, among the above-mentioned paper feed and ejecting units, wherein when said text data from the external apparatus include plural papers of a same size, paper feeding is made from a same paper feed unit for maintaining the highest throughput.

28. A printing apparatus provided with a paper feed unit and a paper ejecting unit as standard components and a paper feed unit and a paper ejecting unit which can be added as optional units, said apparatus comprising:

means for receiving text data from an external apparatus; and means for selecting a combination of the usable paper feed unit and the usable paper ejecting unit, among the above-mentioned paper feed and ejecting units, wherein when an additional paper feed unit and/or an additional paper ejecting unit is added, such additional paper feed and/or ejecting unit is preferentially used unless another designation exists.

29. A printing apparatus according to claim 28, wherein, when the papers run out in the currently selected paper feed unit and still papers are required for continuing the printing process, there is selected a paper feed unit that provides the highest throughput.

30. A printing apparatus according to claim 29, wherein, when a recovery printing process is executed after occurrence of paper jamming, the recovery printing process waits, when the paper feeding is not possible from the designated paper feed unit, until said paper feed unit becomes available, or, when the paper ejecting is not possible to the designated paper ejecting unit, until said paper ejecting unit becomes available.

31. A printing apparatus, provided with a paper feed unit and a paper ejecting unit as standard components and a paper feed unit and a paper ejecting unit which can be added as optional units, said apparatus comprising:

means for receiving text data from an external apparatus; and means for selecting a combination of the usable paper feed unit and the usable paper ejecting unit, among the above-mentioned paper feed and ejecting units, wherein, in case of effecting a recovery printing starting from the occurrence of jamming, said means for selecting causes the recovery printing to be executed according to the original designation of the paper feed means or the paper ejecting means, even when the automatic paper feed/ejecting mode is selected at the occurrence of jamming.

32. An option unit controlling apparatus for an image forming apparatus to which plural kinds of option units are connectable:

connection means for detachably connecting said option unit controlling apparatus to a main body of the image forming apparatus;

receiving means for receiving data from the main body of said image forming apparatus; and control means for controlling at least one of the plural kinds of option units connected to a main body of said image forming apparatus on the basis of the data received by said receiving means, wherein said option unit control apparatus controls at least one option unit that is detached from said option unit control apparatus.

33. An apparatus according to claim 32, wherein said control means includes means for determining an option unit to be operated on the basis of the data received by said receiving means.

34. An apparatus according to claim 32, wherein the main body of said image forming apparatus forms an image on a recording medium, and wherein said plural kinds of option units includes at least one of paper feeding means of the recording medium or paper discharging member.

35. An apparatus according to claim 34, further comprising means for informing the main body of said image forming apparatus of a feeding position of the recording medium.

36. An apparatus according to claim 32, further comprising:

means for detecting a status of at least one of the plural kinds of option units connected to the main body of the image forming apparatus, wherein said control means controls at least one of the plural kinds of option units connected to the main body of said image forming apparatus, on the basis of the data received by said receiving means and the status of the option unit detected by said detecting means.

* * * * *

UNITED STATES PATENT AND TRADEMARK OFFICE
CERTIFICATE OF CORRECTION

PATENT NO. : 5,963,755

DATED : October 5, 1999

INVENTOR(S): SHIGERU UEDA, ET AL.

It is certified that error appears in the above-identified patent and that said Letters Patent is hereby corrected as shown below:

Title page,

Insert: --[*] Notice: This patent is a continued prosecution application filed under 37 CFR 1.53(d), and is subject to the twenty year patent term provisions of 35 U.S.C. 154(a)(2).--.

COLUMN 7:
Line 47, "a" (second occurrence) should read --the--.

COLUMN 9:
Line 1, "embodiment,." should read --embodiment,--.

Signed and Sealed this

Fifth Day of December, 2000

Attest:

Q. TODD DICKINSON

*Attesting Officer*  *Director of Patents and Trademarks*